US012647703B2

(12) United States Patent
Yanagimachi et al.

(10) Patent No.: US 12,647,703 B2
(45) Date of Patent: Jun. 2, 2026

(54) WAVELENGTH CONVERSION APPARATUS, OPTICAL TRANSMISSION APPARATUS, AND WAVELENGTH CONVERSION METHOD

(71) Applicants:NEC Corporation, Tokyo (JP); National University Corporation Tokai National Higher Education and Research System, Nagoya (JP)

(72) Inventors: Shigeyuki Yanagimachi, Tokyo (JP); Hiroshi Hasegawa, Aichi (JP); Daisuke Saito, Aichi (JP); Yojiro Mori, Aichi (JP)

(73) Assignees: NEC CORPORATION, Tokyo (JP); NATIONAL UNIVERSITY CORPORATION TOKAI NATIONAL HIGHER EDUCATION AND RESEARCH SYSTEM, Nagoya (JP)

( * ) Notice: Subject to any disclaimer, the term of this patent is extended or adjusted under 35 U.S.C. 154(b) by 281 days.

(21) Appl. No.: 18/598,081

(22) Filed: Mar. 7, 2024

(65) Prior Publication Data

US 2024/0305914 A1     Sep. 12, 2024

(30) Foreign Application Priority Data

Mar. 8, 2023     (JP) ................................. 2023-035469

(51) Int. Cl.
*H04B 10/00*          (2013.01)
*H04J 14/02*          (2006.01)
(Continued)

(52) U.S. Cl.
CPC ...... *H04Q 11/0005* (2013.01); *H04J 14/0212* (2013.01); *H04Q 2011/0011* (2013.01); *H04Q 2011/0016* (2013.01)

(58) Field of Classification Search
CPC .... H04B 10/29; H04B 10/291; H04B 10/294; H04J 14/02; H04J 14/0201; H04J 14/0206;
(Continued)

(56) References Cited

U.S. PATENT DOCUMENTS

| 7,149,433 B2 * | 12/2006 | Grubb | ................ H04B 10/2939 |
| | | | 398/175 |
| 7,483,636 B2 * | 1/2009 | Aoki | ................... H04J 14/0219 |
| | | | 398/83 |
| 7,483,637 B2 * | 1/2009 | Gumaste | ............. H04J 14/0294 |
| | | | 398/58 |

FOREIGN PATENT DOCUMENTS

| JP | 2001-24594 A | 1/2001 |
| JP | 2001-44546 A | 2/2001 |

(Continued)

OTHER PUBLICATIONS

Daisuke Saito, et al., "Cost-effective Network Expansion Method with Multi-band Virtual Bypass Links", IEICE, Society Conference, Communications society, B-12-3, Sep. 2022, 2 pages.

*Primary Examiner* — Daniel G Dobson
(74) *Attorney, Agent, or Firm* — Sughrue Mion, PLLC

(57)          ABSTRACT

A wavelength conversion apparatus includes: a first demultiplexer wavelength-separating an optical signal having wavelengths of a first band wavelength-multiplexed into n drop signals acquired by wavelength-multiplexing optical signals of predetermined wavelengths and a through signal acquired by wavelength-multiplexing an optical signal of a wavelength being not a target of wavelength conversion; a second demultiplexer demultiplexing optical signals of the predetermined wavelengths included in the n drop signals into optical signals; n wavelength converters wavelength-converting first optical signals of wavelengths included in the optical signals into second optical signals of the second
(Continued)

band; n first multiplexers multiplexing the wavelength-converted second optical signals, and outputting n third optical signals; and a multiplexing unit multiplexing and outputting the n third optical signals, an optical signal acquired by wavelength-multiplexing wavelengths of a second band previously wavelength-separated from the wavelength-multiplexed optical signal, and the through signal.

10 Claims, 14 Drawing Sheets

(51) Int. Cl.
*H04Q 11/00* (2006.01)
*H04J 14/00* (2006.01)

(58) Field of Classification Search
CPC .. H04J 14/0209; H04J 14/021; H04J 14/0212;
H04J 14/0213; H04Q 11/0001; H04Q
11/0003; H04Q 11/0005; H04Q 11/0011;
H04Q 11/0016
See application file for complete search history.

(56) References Cited

FOREIGN PATENT DOCUMENTS

| | | | |
|---|---|---|---|
| JP | 2001-274750 | A | 10/2001 |
| JP | 2006-211591 | A | 8/2006 |
| JP | 2012-15577 | A | 1/2012 |
| JP | 2013-5230 | A | 1/2013 |

* cited by examiner

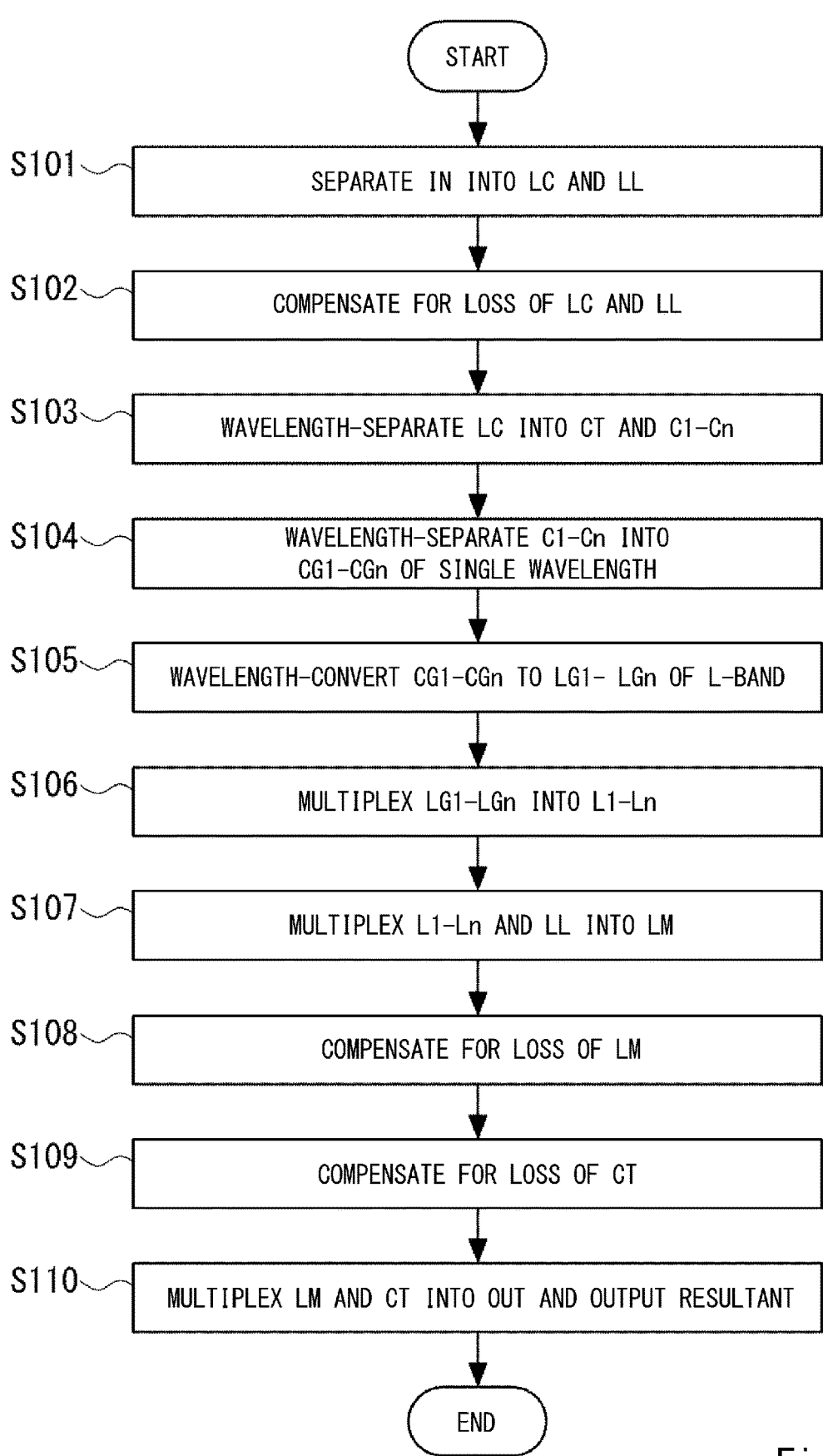

START

S101 — SEPARATE IN INTO LC AND LL

S102 — COMPENSATE FOR LOSS OF LC AND LL

S103 — WAVELENGTH-SEPARATE LC INTO CT AND C1-Cn

S104 — WAVELENGTH-SEPARATE C1-Cn INTO CG1-CGn OF SINGLE WAVELENGTH

S105 — WAVELENGTH-CONVERT CG1-CGn TO LG1- LGn OF L-BAND

S106 — MULTIPLEX LG1-LGn INTO L1-Ln

S107 — MULTIPLEX L1-Ln AND LL INTO LM

S108 — COMPENSATE FOR LOSS OF LM

S109 — COMPENSATE FOR LOSS OF CT

S110 — MULTIPLEX LM AND CT INTO OUT AND OUTPUT RESULTANT

END

F i g. 5

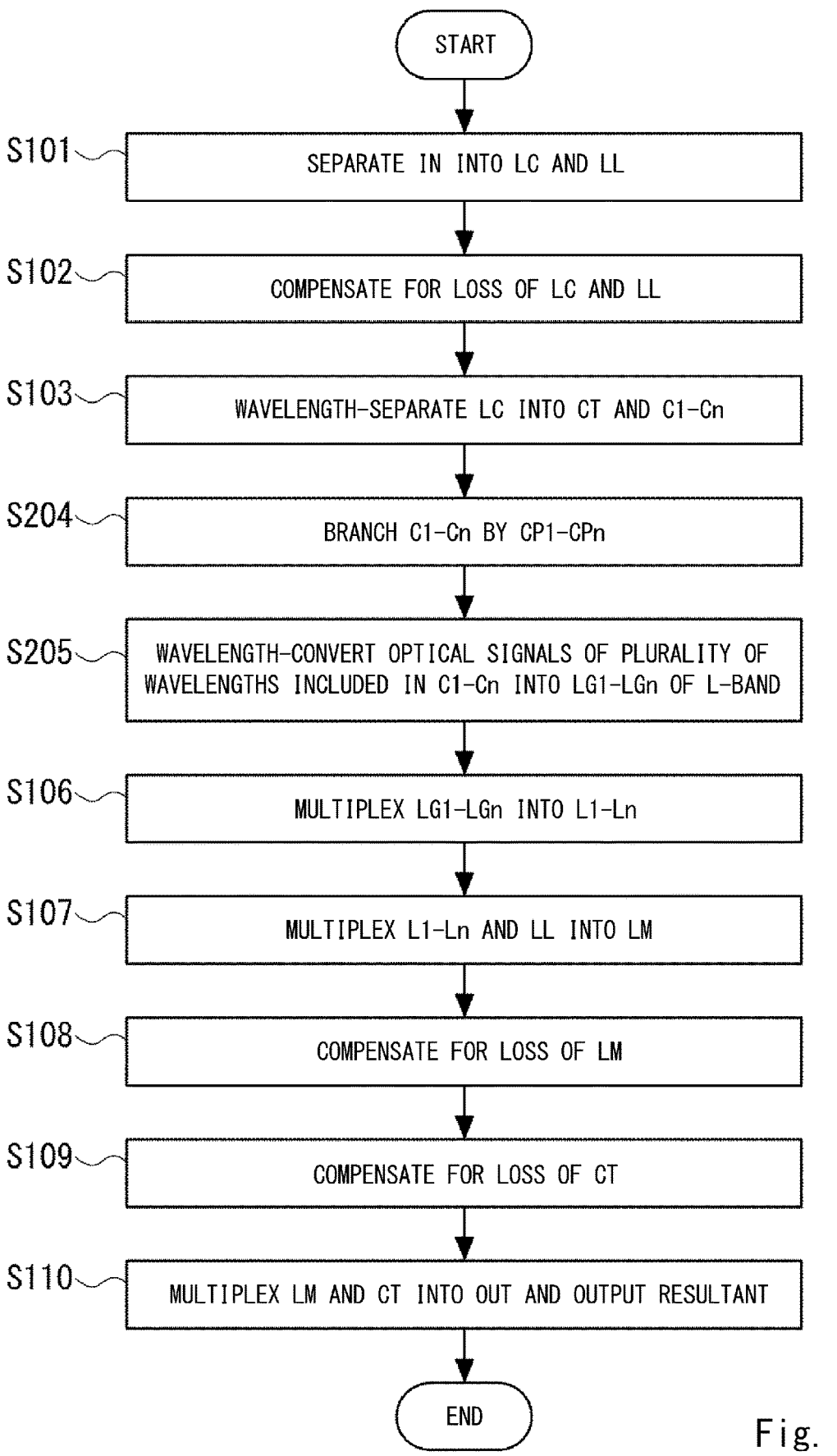

START

S101 — SEPARATE IN INTO LC AND LL

S102 — COMPENSATE FOR LOSS OF LC AND LL

S103 — WAVELENGTH-SEPARATE LC INTO CT AND C1-Cn

S204 — BRANCH C1-Cn BY CP1-CPn

S205 — WAVELENGTH-CONVERT OPTICAL SIGNALS OF PLURALITY OF WAVELENGTHS INCLUDED IN C1-Cn INTO LG1-LGn OF L-BAND

S106 — MULTIPLEX LG1-LGn INTO L1-Ln

S107 — MULTIPLEX L1-Ln AND LL INTO LM

S108 — COMPENSATE FOR LOSS OF LM

S109 — COMPENSATE FOR LOSS OF CT

S110 — MULTIPLEX LM AND CT INTO OUT AND OUTPUT RESULTANT

END

Fig. 8

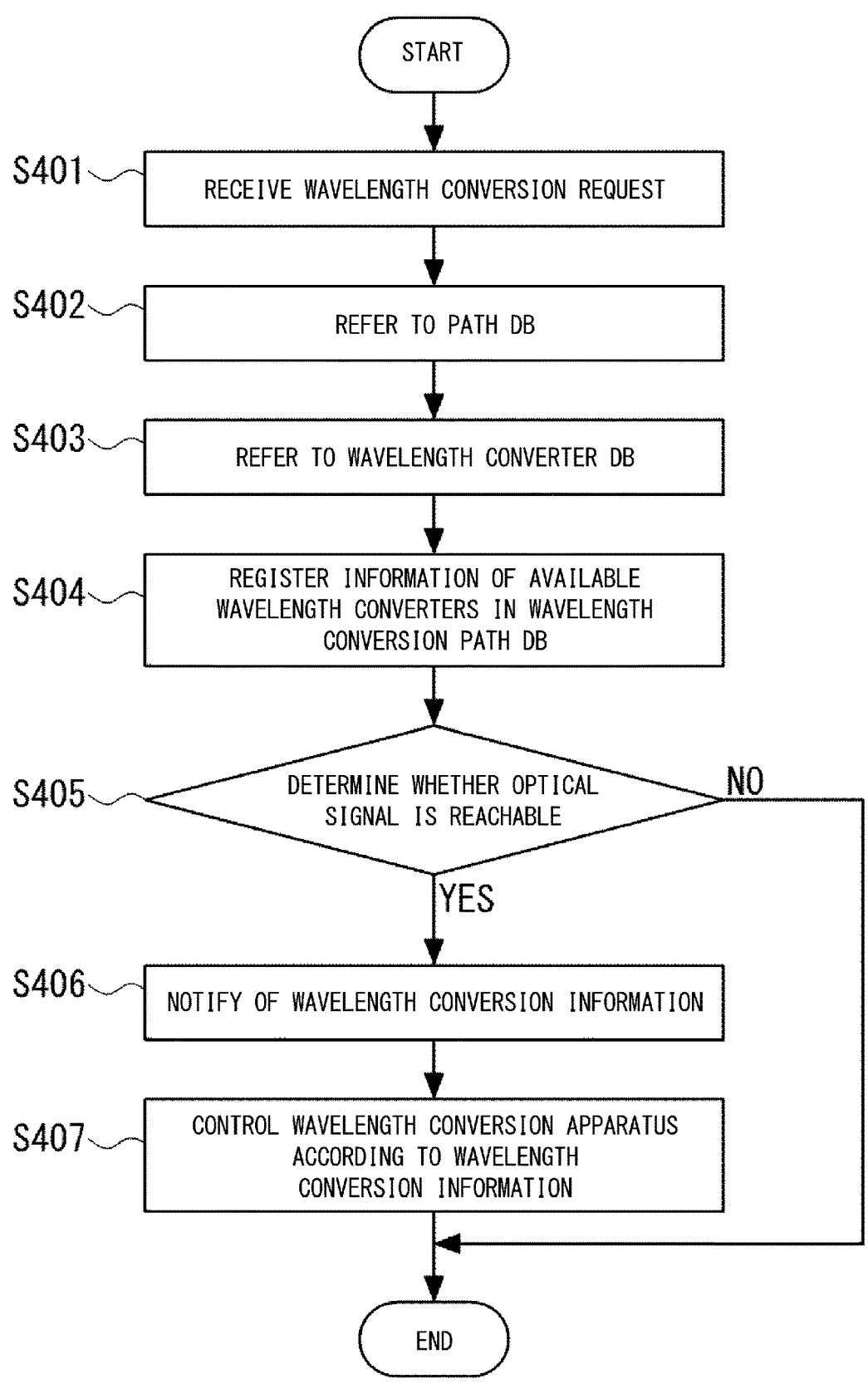
F i g. 14

WAVELENGTH CONVERSION APPARATUS, OPTICAL TRANSMISSION APPARATUS, AND WAVELENGTH CONVERSION METHOD

INCORPORATION BY REFERENCE

This application is based upon and claims the benefit of priority from Japanese patent application No. 2023-35469, filed on Mar. 8, 2023, the disclosure of which is incorporated herein in its entirety by reference.

TECHNICAL FIELD

The present disclosure relates to a wavelength conversion apparatus, an optical transmission apparatus, and a wavelength conversion method.

BACKGROUND ART

In recent years, traffic flowing through a network continues to grow rapidly due to rapid spread of mobile terminals represented by smartphones and large-capacity data communication such as high-definition images caused by advancement of terminals. According to a survey, total download traffic of broadband subscribers in Japan in fiscal 2020 is about 19 Tbps, and continues to increase at an annual rate of about 57%, and traffic is expected to increase in future. In response thereto, in a core network that supports large-capacity communication, a technology that meets a need for large-capacity has been developed, such as a wavelength division multiplexing (WDM) that multiplexes and transmits optical signals of a plurality of different wavelengths into one optical fiber, and an advanced modulation system such as dual polarization differential quadrature phase shift keying (DP-QPSK) and 16 quadrature amplitude modulation (16-QAM).

Furthermore, along with development of 5G services in wireless communication, there is an increasing need not only for increasing the capacity but also for reducing delay of the network. In response to these needs, in recent years, an all photonics network that achieves a large-capacity and low-delay network has been proposed in an innovative optical and wireless network (IOWN) concept led by Nippon Telegraph and Telephone Corporation (NTT). Unlike a typical network with electrical conversion at a switching node, the all photonics network performs transmission as light in all paths. For this reason, the network is not restricted to capacity of an electric switch, and not only can communication be performed with large capacity, but also there is no delay associated with the electric conversion, and it is possible to reduce the delay.

However, when a wavelength path is used in a communication unit as described above, a problem of wavelength resources occurs. Currently, a wavelength band to be mainly used is a C-band, but wavelength resources are at most about 100 waves. Meanwhile, L-band expansion being a method using an L-band, and spatial multiplexing transmission having a plurality of cores in one fiber have been studied. In the spatial multiplexing transmission, an optical fiber for spatial multiplexing communication, an optical amplifier for spatial multiplexing in order to compensate for transmission loss, and the like have been studied, but a device is at a development stage and a new transmission path leads to an increase in cost, and therefore, this approach is considered to be a future technology at present. The L-band expansion is a realistic approach because a fiber and a device have already been developed and current transmission lines are available. However, when the L-band expansion is applied to the entire network, it is necessary to introduce an optical amplifier and an optical switch for the L-band to all nodes, which increases the cost.

In response thereto, a method of suppressing a rapid increase in cost while performing L-band expansion has been proposed (Daisuke Saito, 4 others "Cost-effective Network Expansion Method with Multi-band Virtual Bypass Links", September 2022, The Institute of Electronics, Information and Communication Engineers Society conference, Communication Society, B-12-3). In this method, instead of performing the L-band expansion in the entire network, a part of the C-band wavelength is converted into an L-band wavelength and bypassed in only a part of the link that becomes a bottleneck. In Saito, et al, in a network model JPN12, traffic between nodes in the central region is congested, and an increase in the total capacity is hindered. In this method, the L-band expansion is applied only to such a bottleneck section. Specifically, a part of an optical signal of the C-band wavelength is wavelength-converted into the L-band at a first node, and transmitted to a next second node. In the second node, only the C-band optical signal is switched, and the L-band is cut-through and transmitted to a third node. In the third node, the optical signal of the L-band wavelength is wavelength-converted into the C-band again. Namely, a part of the optical signal of the C-band wavelength is shifted to the optical signal of the L-band wavelength between the first node and the third node, and a degree of bottleneck is reduced, thereby achieving capacity expansion of the entire network. As a result, it has been reported that, in Saito, et al, for example, the capacity of the entire network can be improved by 9% by shifting 16% of the optical signal of the C-band wavelength to the L-band with respect to a link only between congested nodes.

As a method of wavelength conversion, all optical wavelength conversion using nonlinearity of light, wavelength conversion using a transponder function, and the like have been proposed and used. In the all optical wavelength conversion, there is an advantage that delay is less because the wavelength conversion is performed as light, but there is a problem that a wavelength conversion device has a large optical loss, a transmittable distance is limited, and the like. Further, in the transponder function, complete waveform molding is performed by so-called 3R (amplification: Re-amplification, waveform shaping: Re-shaping, and bit-spacing adjustment: Re-timing) regeneration through digital signal-processing. Therefore, the transmission distance is not limited, but there is a problem that delay occurs in digital signal processing. In response thereto, there is a configuration in which an analog electric signal between a transmitter and a receiver is folded back without passing through a digital signal processing unit (hereinafter, referred to as analog wavelength conversion). In the analog wavelength conversion, since digital processing is not performed, another function of compensating for signal degradation accumulated in the transmission path so far is added. For example, there is a method of providing an analog signal processing unit between a coherent reception front end and a coherent transmission front end, correcting a band, and the like. Low-cost and low-delay analog wavelength conversion is expected to be used in a method of diverting only relatively short paths to the L-band, such as in the approach according to Saito, et al.

In order to avoid restriction of routing control, a node configuration method of switching a signal of any wavelength to any direction without wavelength collision is required in a node being currently used. The wavelength-multiplexed optical signal is separated into, for example, a C-band optical signal and an L-band optical signal, and the C-band optical signal is subjected to wavelength conversion. The C-band optical signal is input to an apparatus or the like that performs wavelength conversion, and an optical signal of each wavelength in the C-band to be converted is wavelength-converted into an optical signal of a wavelength in the L-band.

A wavelength band converter that performs wavelength conversion of such a C-band wavelength-multiplexed optical signal into an L-band wavelength signal has been proposed (Japanese Unexamined Patent Application Publication No. 2001-274750). The wavelength band converter is provided with an optical band separation apparatus that separates a wavelength-multiplexed optical signal into optical signals of wavelengths to be wavelength-converted. In general, such an optical band separation apparatus uses, for example, a broadband optical coupler. The wavelength-multiplexed optical signal being input to the optical band separation apparatus is separated for each of the C-band and the L-band, and then the wavelength band converter can collectively wavelength-convert the wavelength-multiplexed optical signal of the C-band into the wavelength-multiplexed optical signal of the L-band, or the wavelength-multiplexed optical signal of the L-band into the wavelength-multiplexed optical signal of the C-band. In general, all light wavelength conversion is used as a method of collective wavelength conversion. The wavelength-multiplexed optical signal in the C-band and the optical signal wavelength-converted into the wavelength-multiplexed optical signal in the L-band are level-adjusted and then multiplexed by a multiplexing apparatus, and transmitted as a wavelength-multiplexed optical signal.

In addition, various node configuration methods of switching a signal of any wavelength to any direction without wavelength collision have been proposed (for example, Japanese Unexamined Patent Application Publication No. 2013-5230 and Japanese Unexamined Patent Application Publication No. 2006-211591). Various proposals have also been made for transmission of optical signals in the C-band and L-band (for example, Japanese Unexamined Patent Application Publication No. 2001-24594, Japanese Unexamined Patent Application Publication No. 2001-44546 and Japanese Unexamined Patent Application Publication No. 2012-15577).

SUMMARY

In an optical network in which wavelength conversion is performed on a general optical network using a C-band, and a part of wavelengths is shifted to an L-band (which may be a band of a different frequency such as an S-band) for performing capacity expansion, the following problems exist.

A first problem is that cost of a network performing L-band expansion is significantly increased as compared with a general network using a C-band. As described above, it is necessary to separate C-band optical signals to be converted for each wavelength. Therefore, it is necessary to provide the same number of output ports as the number of wavelengths of the C-band to be converted into the L-band in a configuration for performing wavelength separation arranged in each node, such as a WSS. As a result, a relatively expensive WSS becomes complicated, which causes an increase in cost.

The present disclosure has been made in view of the above-described circumstances, and an example object of the present disclosure is to achieve wavelength conversion for bypassing an optical signal of a certain band to another band in transmission of a wavelength-multiplexed optical signal, with a simple configuration.

In a first example aspect of the present disclosure, a wavelength conversion apparatus includes: a first demultiplexer configured to wavelength-separate an optical signal having a plurality of wavelengths of a first band that are wavelength-multiplexed, which is wavelength-separated in advance from a wavelength-multiplexed optical signal including optical signals of the first band and a second band, into n drop signals acquired by wavelength-multiplexing optical signals of a plurality of predetermined wavelengths to be subjected to wavelength conversion and a through signal acquired by wavelength-multiplexing optical signals of wavelengths not to be subjected to wavelength conversion; n second demultiplexers configured to demultiplex the optical signals of the plurality of predetermined wavelengths being included in the n drop signals into a plurality of optical signals; n wavelength converters configured to wavelength-convert first optical signals of wavelengths included in the plurality of optical signals demultiplexed by the n second demultiplexers into a plurality of second optical signals of the second band; n first multiplexers configured to multiplex the plurality of second optical signals after wavelength conversion that are output from the n wavelength converters and output n third optical signals; and a multiplexing unit configured to multiplex the n third optical signals, an optical signal having a plurality of wavelengths of the second band that are wavelength-multiplexed, which is wavelength-separated in advance from the wavelength-multiplexed optical signal, and the through signal, and output the resultant.

In a second example aspect of the present disclosure, an optical transmission apparatus includes: a third demultiplexer configured to wavelength-separate, from a wavelength-multiplexed optical signal including optical signals of a first band and a second band, an optical signal having a plurality of wavelengths of the first band that are wavelength-multiplexed and an optical signal having a plurality of wavelengths of the second band that are wavelength-multiplexed; and a wavelength conversion apparatus, wherein the wavelength conversion apparatus includes: a first demultiplexer configured to wavelength-separate an optical signal having a plurality of wavelengths of the first band that are wavelength-multiplexed, which is wavelength-separated by the third demultiplexer, into n drop signals acquired by wavelength-multiplexing optical signals of a plurality of predetermined wavelengths to be subjected to wavelength conversion and a through signal acquired by wavelength-multiplexing optical signals of wavelengths not to be subjected to wavelength conversion; n second demultiplexers configured to demultiplex the optical signal of the plurality of predetermined wavelengths being included in the n drop signals into a plurality of optical signals; n wavelength converters configured to wavelength-convert first optical signals of wavelengths being included in the plurality of optical signals being demultiplexed by the n second demultiplexers into a plurality of second optical signals of the second band; n first multiplexers configured to multiplex the plurality of second optical signals after wavelength conversion that are output from the n wavelength converters and output n third optical signals; and a multiplexing unit configured to multiplex and output the n third optical signals, an optical signal having a plurality of wavelengths of the second band that are wavelength-multiplexed, which is wavelength-separated by the third demultiplexer, and the through signal.

In a third example aspect of the present disclosure, a wavelength conversion method includes: wavelength-separating, by a first demultiplexer, an optical signal having a plurality of wavelengths of a first band that are wavelength-multiplexed, which is wavelength-separated in advance from a wavelength-multiplexed optical signal including optical signals of the first band and a second band, into n drop signals acquired by wavelength-multiplexing optical signals of a plurality of predetermined wavelengths to be subjected to wavelength conversion and a through signal acquired by wavelength-multiplexing optical signals of wavelengths not to be subjected to wavelength conversion; demultiplexing, by n second demultiplexers, optical signals of the plurality of predetermined wavelengths being included in the n drop signals into a plurality of optical signals; wavelength-converting, by n wavelength converters, first optical signals of wavelengths being included in the plurality of optical signals demultiplexed by the n second demultiplexers into a plurality of second optical signals of the second band; multiplexing the plurality of second optical signals after wavelength conversion that are output from the n wavelength converters and outputting n third optical signals; and multiplexing and outputting the n third optical signals, an optical signal having a plurality of wavelengths of the second band that are wavelength-multiplexed, which is wavelength-separated in advance from the wavelength-multiplexed optical signal, and the through signal.

According to the present disclosure, in transmission of a wavelength-multiplexed optical signal, wavelength conversion for bypassing an optical signal of a certain band to another band can be achieved with a simple configuration.

BRIEF DESCRIPTION OF DRAWINGS

The above and other aspects, features, and advantages of the present disclosure will become more apparent from the following description of certain example embodiments when taken in conjunction with the accompanying drawings, in which:

FIG. 5 is a flowchart of an operation of the optical transmission apparatus according to the first example embodiment;

FIG. 8 is a flowchart of an operation of an optical transmission apparatus according to the second example embodiment;

FIG. 14 is a flowchart of an operation of the optical transmission network according to the fourth example embodiment.

EXAMPLE EMBODIMENT

Figure 1:
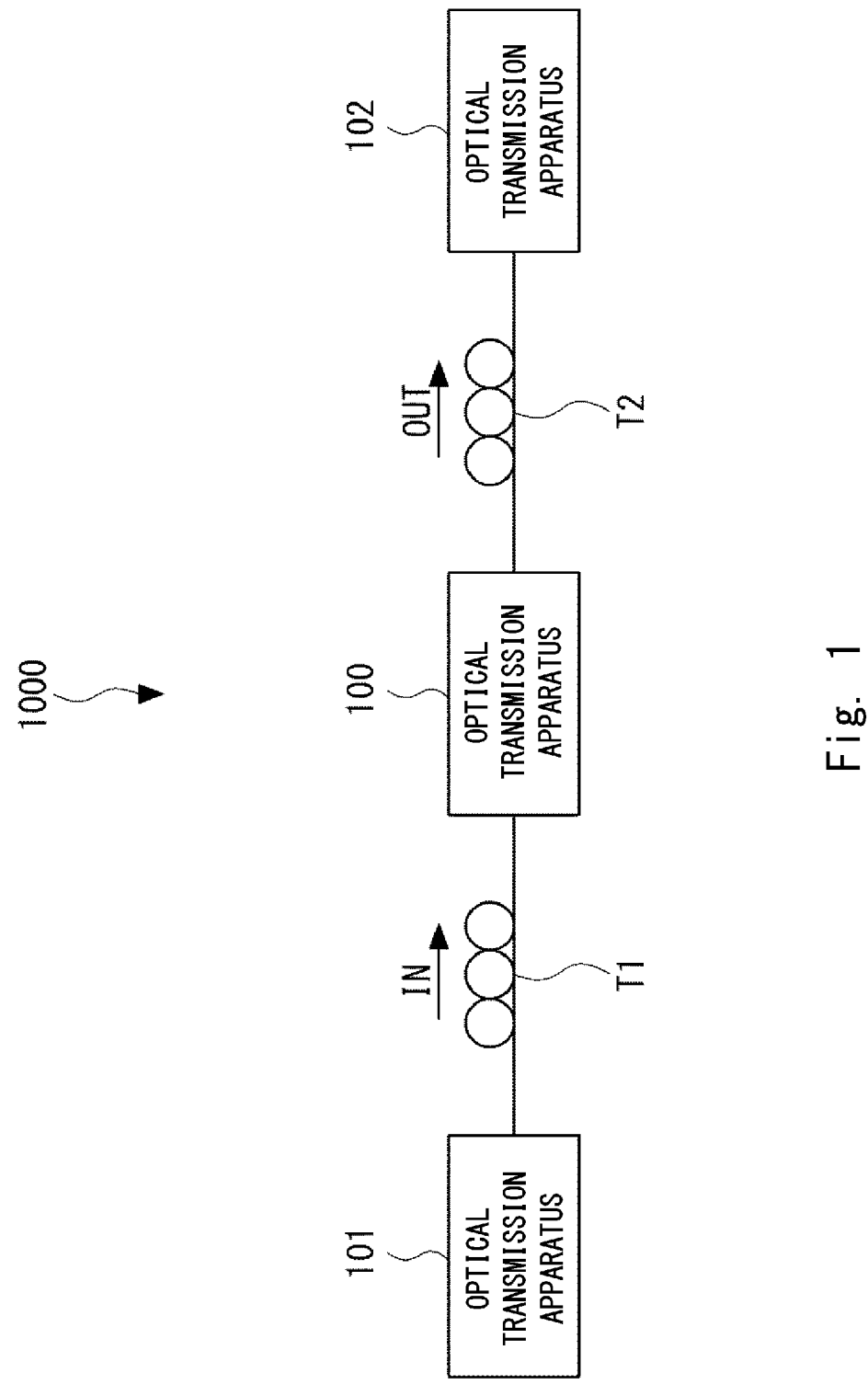
FIG. 1 is a diagram schematically illustrating a configuration of an optical transmission network according to a first example embodiment.

Hereinafter, example embodiments according to the present disclosure will be described with reference to the drawings. In the drawings, the same elements are denoted by the same reference numerals, and redundant descriptions are omitted as necessary.

First Example Embodiment

An optical transmission network according to a first example embodiment will be described. FIG. 1 schematically illustrates a configuration of an optical transmission network according to the first example embodiment. An optical transmission network includes a plurality of node apparatuses and an optical transmission path connecting the node apparatuses. Hereinafter, various types of optical transmission apparatuses that perform transmission and reception optical signals, amplification, add/drop, and the like will be described as node apparatuses. Herein, for simplicity of explanation, an optical transmission network 1000 including three node apparatuses, i.e., three optical transmission apparatuses 100 to 102, will be described as an example. In the example of FIG. 1, the optical transmission apparatus 100 is disposed in such a way as to be sandwiched between the optical transmission apparatus 101 and the optical transmission apparatus 102. The optical transmission apparatus 100 and the optical transmission apparatus 101 are connected by an optical transmission line T1, and the optical transmission apparatus 100 and the optical transmission apparatus 102 are connected by an optical transmission line T2.

The optical transmission network 1000 of FIG. 1 is merely an example, and it is needless to say that the number of node apparatuses, i.e., any number of optical transmission apparatuses may be provided, and the number of optical transmission lines may be an optional number. In addition, any optical transmission network in which any optical transmission apparatuses are connected by an optical transmission line may be configured.

Figure 2:
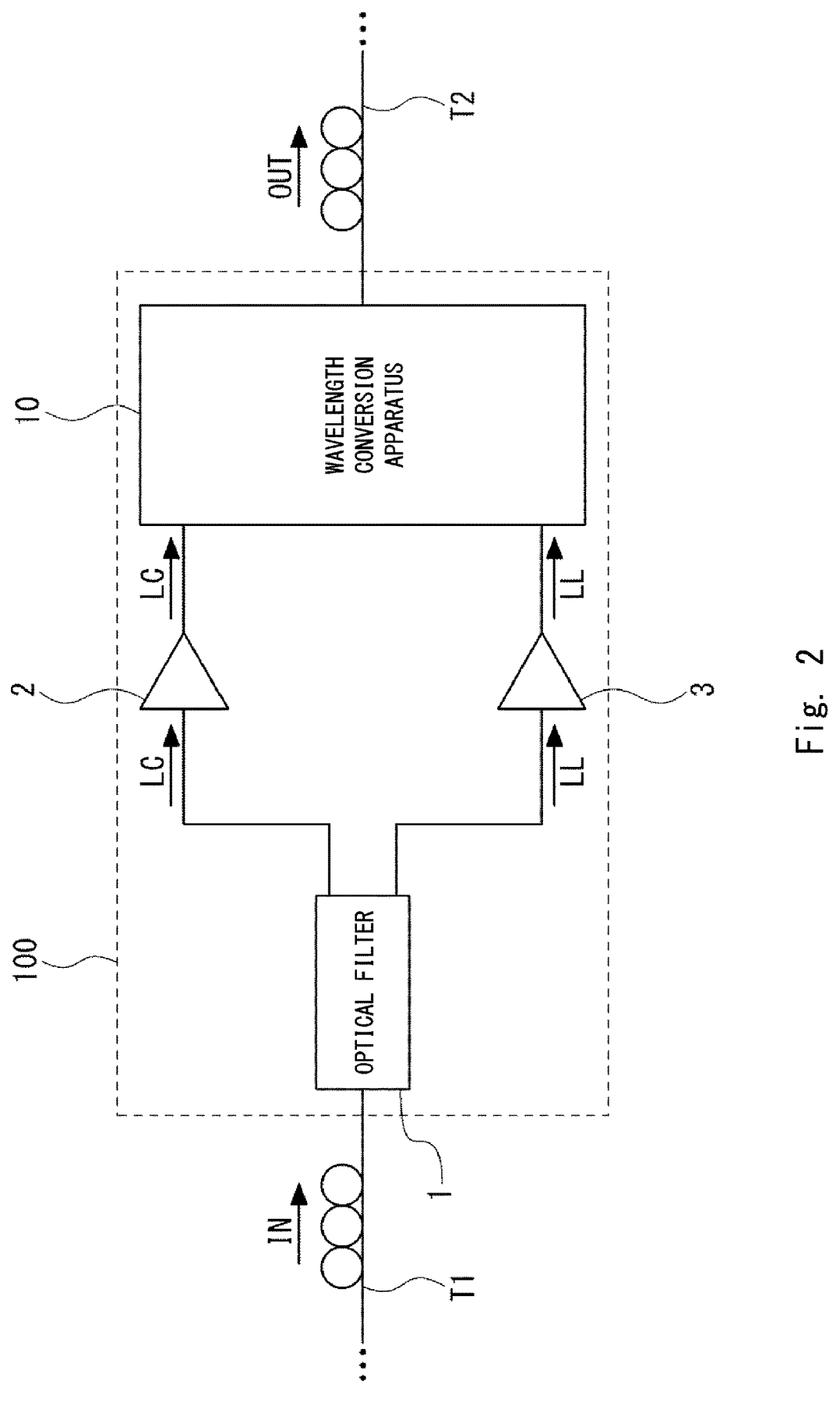
FIG. 2 is a diagram schematically illustrating a configuration of an optical transmission apparatus according to the first example embodiment.

Among the optical transmission apparatuses 100 to 102, the optical transmission apparatus 100 is configured as a node apparatus that performs wavelength conversion on an optical signal extracted from a C-band among the received optical signals and performs bypass to a L-band. In the following description, the C-band is also referred to as a first band, and the L-band is also referred to as a second band. Hereinafter, the optical transmission apparatus 100 will be described. FIG. 2 schematically illustrates a configuration of the optical transmission apparatus 100 according to the first example embodiment. The optical transmission apparatus 100 includes an optical filter 1, optical amplifiers 2 and 3, and a wavelength conversion apparatus 10.

An input of the optical filter 1 is connected to an optical transmission line T1 that transmits a wavelength-multiplexed optical signal IN from the optical transmission apparatus 101. In this example, the wavelength-multiplexed optical signal IN is an optical signal in which an optical signal of a plurality of wavelengths of the C-band and an optical signal of a plurality of wavelengths of the L-band are wavelength-multiplexed.

Hereinafter, simply a term "wavelength" in a wavelength-multiplexed optical signal refers to the center wavelength of each channel.

The optical filter 1 wavelength-separates a wavelength-multiplexed optical signal LC of the C-band and a wavelength-multiplexed optical signal LL of the L-band from a wavelength-multiplexed optical signal IN, outputs the wavelength-multiplexed optical signal LC of the C-band to the optical amplifier 2, and outputs the wavelength-multiplexed optical signal LL of the L band to the optical amplifier 3. The optical amplifier 2 amplifies the input wavelength-multiplexed optical signal LC of the C-band and then outputs the amplified signal to the wavelength conversion apparatus 10. The optical amplifier 3 amplifies the input wavelength-multiplexed optical signal LL of the L-band and then outputs the amplified signal to the wavelength conversion apparatus 10. The optical filter 1 is also referred to as a third demultiplexer.

The wavelength conversion apparatus 10 wavelength-converts a part of the optical signals of a plurality of wavelengths included in the wavelength-multiplexed optical signal LC of the C-band into an optical signal of a wavelength of the L-band, multiplexes the optical signals with unconverted C-band and L-band wavelength-multiplexed optical signals, and outputs a wavelength-multiplexed optical signal OUT. The wavelength-multiplexed optical signal OUT is transmitted to the optical transmission apparatus 102 via the optical transmission line T2.

Figure 3:
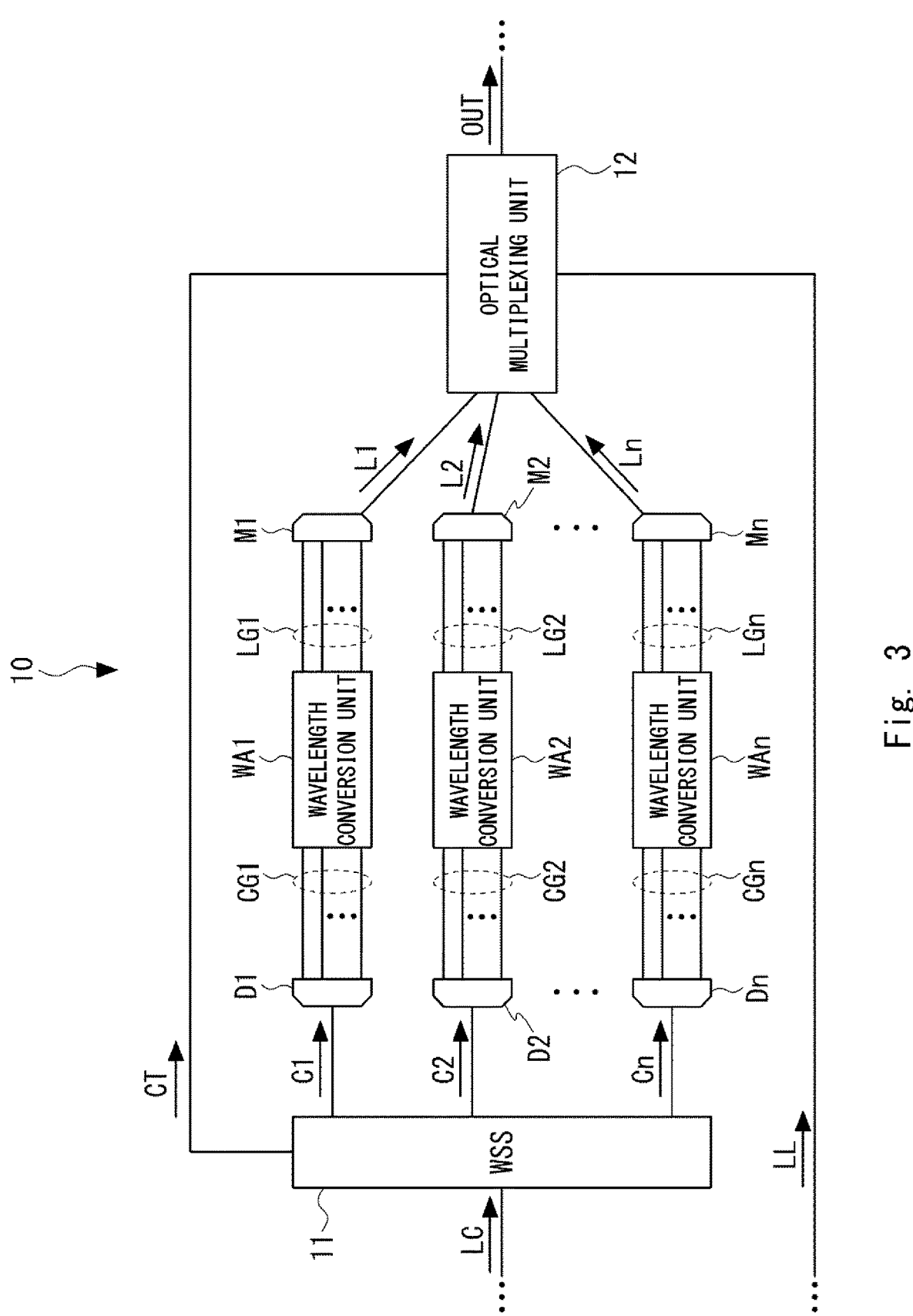
FIG. 3 is a diagram schematically illustrating a configuration of a wavelength conversion apparatus according to the first example embodiment.

FIG. 3 schematically illustrates a configuration of the wavelength conversion apparatus 10. The wavelength conversion apparatus 10 includes a wavelength selective switch (hereinafter referred to as WSS) 11, an optical multiplexing unit 12, wavelength separation filters D1 to Dn, wavelength multiplexing filters M1 to Mn, and wavelength converters WA1 to WAn. Note that n is an integer of 2 or more.

The input of the WSS 11 is connected to the output of the optical amplifier 2 via the optical transmission line T1, and the amplified C-band wavelength-multiplexed optical signal LC is input. N output ports of the WWS 11 are connected to the wavelength separation filters D1 to Dn, respectively, and the through ports are connected to the optical coupler 14. The WSS 11 wavelength-separates a part of the optical signals of a plurality of wavelengths included in the C-band wavelength-multiplexed optical signal LC as drop signals C1 to Cn, which are wavelength-multiplexed optical signals, and an optical signal of a wavelength other than the drop signal as a through signal CT, which is a wavelength-multiplexed optical signal. The drop signals C1 to Cn are wavelength-separated as wavelength-multiplexed optical signals including optical signals of two or more wavelengths, and are output to the wavelength separation filters D1 to Dn, respectively. The WSS 11 is also referred to as a first demultiplexer.

The wavelength separation filters D1 to Dn are configured, for example, as 37.5 GHz-grid narrow-bandwidth arrayed waveguide gratings (AWG). The outputs of the wavelength separation filters D1 to Dn are connected to the wavelength converters WA1 to WAn, respectively. The wavelength separation filters D1 to Dn wavelength-separate the drop signals C1 to Cn as optical signals of a single wavelength, and output the resultant signals to the wavelength converters WA1 to WAn, respectively. Herein, optical signal groups acquired by wavelength-separating the drop signals C1 to Cn into a single wavelength are indicated by reference numerals CG1 to CGn, respectively. Note that each of the wavelength separation filters D1 to Dn is also referred to as a second demultiplexer. Each of the optical signals of a single wavelength acquired by wavelength-separating the drop signals C1 to Cn is also referred to as a first optical signal.

The wavelength converters WA1 to WAn respectively convert the optical signals of wavelengths included in the C-band optical signal groups CG1 to CGn into optical signals of the L-band, and output the resultant signals as L-band optical signal groups LG1 to LGn to the wavelength multiplexing filters M1 to Mn. Note that each of the optical signals of a single wavelength included in the L-band optical signal groups LG1 to LGn is also referred to as a second optical signal.

The wavelength multiplexing filters M1 to Mn are configured, for example, as a wide bandwidth AWG of a 200 GHz grid. The wavelength multiplexing filters M1 to Mn multiplex the optical signals of two or more single-wavelengths included in the L-band optical signal groups LG1 to LGn, and output the resultant signals to the optical multiplexing unit 12 as wavelength-multiplexed optical signals L1 to Ln after the L-band conversion. Note that each of the wavelength multiplexing filters M1 to Mn is also referred to as a first multiplexer. Each of the wavelength-multiplexed optical signals L1 to Ln after the L-band conversion is also referred to as a third optical signal.

The optical multiplexing unit 12 multiplexes the wavelength-multiplexed optical signals L1 to Ln after the L-band conversion, the wavelength-multiplexed optical signal LL of the L-band amplified by the optical amplifier 3, and the through signal CT, and outputs the resultant signal as a wavelength-multiplexed optical signal OUT.

Figure 4:
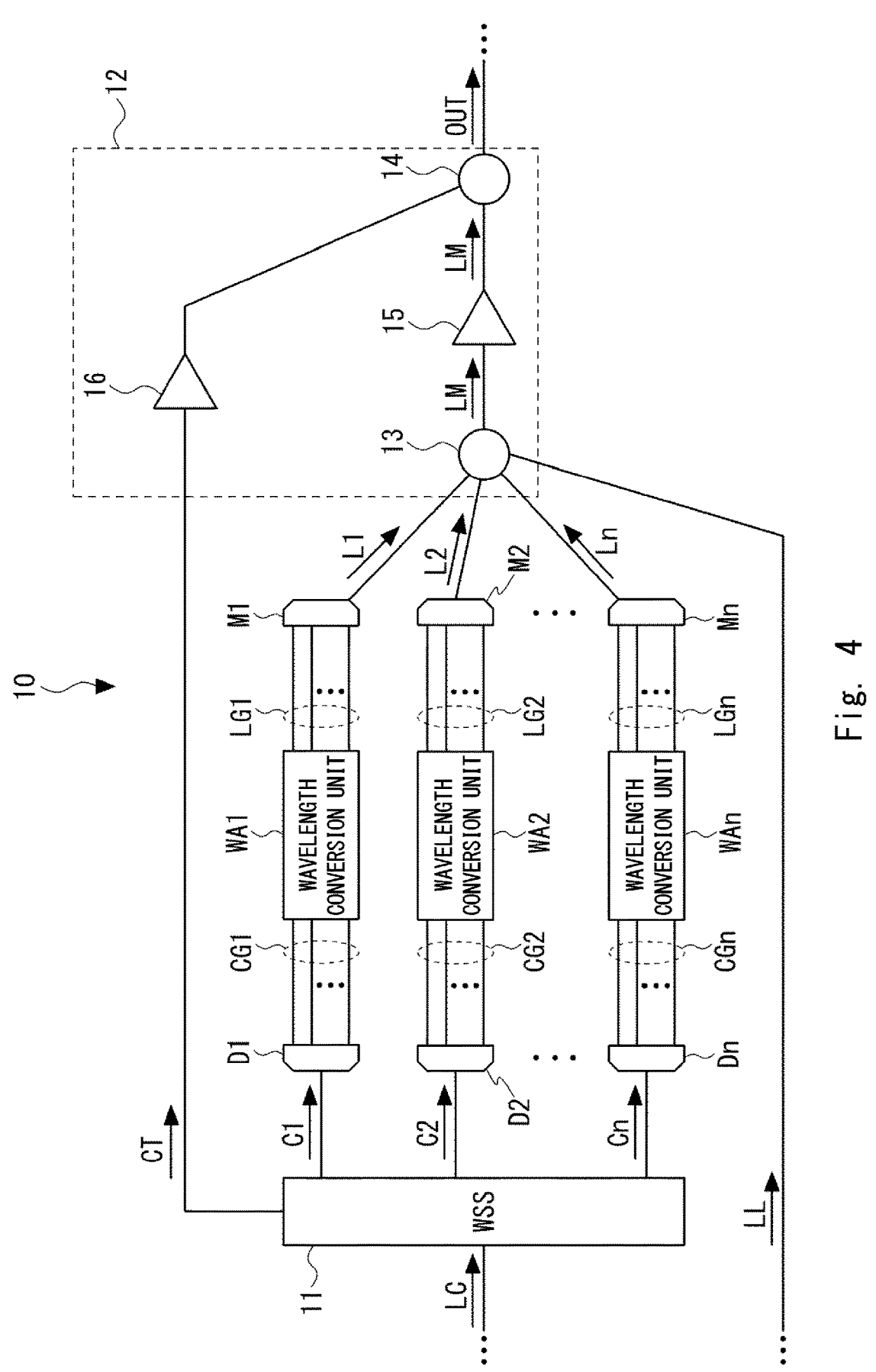
FIG. 4 is a diagram illustrating the configuration of the wavelength conversion apparatus according to the first example embodiment in more detail.

An optical amplifier may be inserted into the wavelength conversion apparatus 10 in order to compensate for attenuation of an optical signal as appropriate. Further, the optical multiplexing unit may be constituted by a plurality of couplers. FIG. 4 illustrates a configuration of the wavelength conversion apparatus 10 in more detail. As illustrated in FIG. 4, the optical multiplexing unit 12 includes optical couplers 13 and 14 and optical amplifiers 15 and 16. The optical coupler 13 is also referred to as a second multiplexer, and the optical coupler 14 is also referred to as a third multiplexer. The optical amplifier 15 is also referred to as a first optical amplifier, and the optical amplifier 16 is also referred to as a second optical amplifier.

The optical coupler 13 multiplexes the wavelength-multiplexed optical signals L1 to Ln after the L-band conversion and the wavelength-multiplexed optical signal LL of the L-band amplified by the optical amplifier 3, and outputs the resultant signal as a wavelength-multiplexed optical signal LM to the optical amplifier 15.

The optical amplifier 15 amplifies the wavelength-multiplexed optical signal LM, performs loss compensation, and outputs the resultant signal to the optical coupler 14.

The optical amplifier 16 is inserted between the through port of the WSS 11 and the optical coupler 14, amplifies the C-band through signal CT, performs loss compensation, and then outputs the amplified through signal CT to the optical coupler 14.

The optical coupler 14 outputs the wavelength-multiplexed optical signal OUT acquired by multiplexing the wavelength-multiplexed optical signal LM loss-compensated by the optical amplifier 15 and the C-band through signal CT loss-compensated by the optical amplifier 16 to the optical transmission line T2.

Further, the wavelength conversion apparatus is mounted with an analog wavelength converter, a 3R regenerative repeater, and the like, and in this case, since the output of the narrow bandwidth AWG is fixed in wavelength for each port, it is necessary for a wavelength converter to receive the fixed wavelength of the C-band and convert to any L-band.

Next, a flow of an operation of the optical transmission apparatus 100 will be described. FIG. 5 illustrates a flowchart of the operation of the optical transmission apparatus 100.

Step S101

The optical filter 1 separates the wavelength-multiplexed optical signal IN into a C-band wavelength-multiplexed optical signal LC and an L-band wavelength-multiplexed optical signal LL.

Step S102

The optical amplifier 2 amplifies the C-band wavelength-multiplexed optical signal LC, and the optical amplifier 3 amplifies the L-band wavelength-multiplexed optical signal LL, and performs loss compensation.

Step S103

The WSS 11 wavelength-separates the C-band wavelength-multiplexed optical signal LC into the through signal CT and the drop signals C1 to Cn.

Step S104

Each of the wavelength separation filters D1 to Dn wavelength-separates the drop signals C1 to Cn received from the WSS 11 into the C-band optical signal groups CG1 to CGn composed of optical signals of a plurality of single wavelengths.

Step S105

The wavelength converters WA1 to WAn respectively wavelength-convert the optical signals of a single wavelength of the C-band included in the C-band optical signal groups CG1 to CGn into optical signals of a single wavelength of the L-band, and output the optical signals as the L-band optical signal groups LG1 to LGn.

Step S106

The wavelength multiplexing filters M1 to Mn multiplex the L-band optical signal groups LG1 to LGn, respectively, and output them as the wavelength-multiplexed optical signals L1 to Ln after the L-band conversion.

Step S107

The optical coupler 13 multiplexes the wavelength-multiplexed optical signals L1 to Ln after the L-band conversion and the wavelength-multiplexed optical signal LL of the L-band amplified by the optical amplifier 3, and outputs the resultant signal as a wavelength-multiplexed optical signal LM.

Step S108

The optical amplifier 15 amplifies the wavelength-multiplexed optical signal LM, performs loss compensation, and outputs the resultant signal to the optical coupler 14.

Step S109

The optical amplifier 16 amplifies the C-band through signal CT being output from the through port of the WSS 11, performs loss compensation, and then outputs the resultant signal to the optical coupler 14.

Step S110

The coupler 14 multiplexes the C-band through signal CT and the L-band wavelength-multiplexed optical signal LM after the loss compensation, and outputs the resultant signal as a wavelength-multiplexed optical signal OUT to the optical transmission line T2.

As in the present configuration, by dropping the wavelength-converted signal in a plurality of wavelength units in the WSS 11, it is possible to suppress the number of relatively expensive WSS ports. For example, assuming that the number of wavelengths included in each of the C-band optical signal groups CG1 to CGn is Wn, it is necessary to provide Wn×N ports in the WSS when a plurality of wavelengths to be converted are separated into a single wavelength by WSS in a general wavelength conversion apparatus that performs L-band transition. On the other hand, according to this configuration, it is possible to reduce the number of ports provided in the WSS 11 to N. As a result, the cost of the WSS can be suppressed, and as a result, a cost of the wavelength conversion apparatus can also be suppressed.

In addition, it is also possible to easily add a wavelength number unit necessary for wavelength conversion. In the optical transmission network, it may be assumed that the number of wavelengths for performing the wavelength conversion from the C-band to the L-band is required to be increased after the start of operation. In this case, in a general configuration in which wavelength conversion is possible, it is necessary to arrange the same number of ports as the maximum value being the number of wavelengths to be shifted expected in future in the WSS for wavelength-separating the wavelength-multiplexed optical signal of the C-band into optical signals of wavelengths. Therefore, it becomes a cause of cost increase. Further, it is difficult to expand the number of transition wavelengths beyond the maximum number of wavelengths to be expected in advance.

On the other hand, according to this configuration, the number of wavelengths to be shifted in the C-band is first divided into optical signals of a plurality of wavelength units, and then further separated into optical signals of a single wavelength, and therefore, the number of wavelengths that can be handled can be easily increased. For example, assuming that the total number of wavelengths of the C-band is 96 waves and the wavelength is separated into optical signals of 16 wave units, the number of ports of the WSS 11 can be suppressed to 96/16=6 ports at the maximum. Thus, the number of ports can be greatly reduced in the WSS in the general configuration as compared with a case where 96 ports have to be provided, and as a result, the required number of ports can be easily secured.

Figure 6:
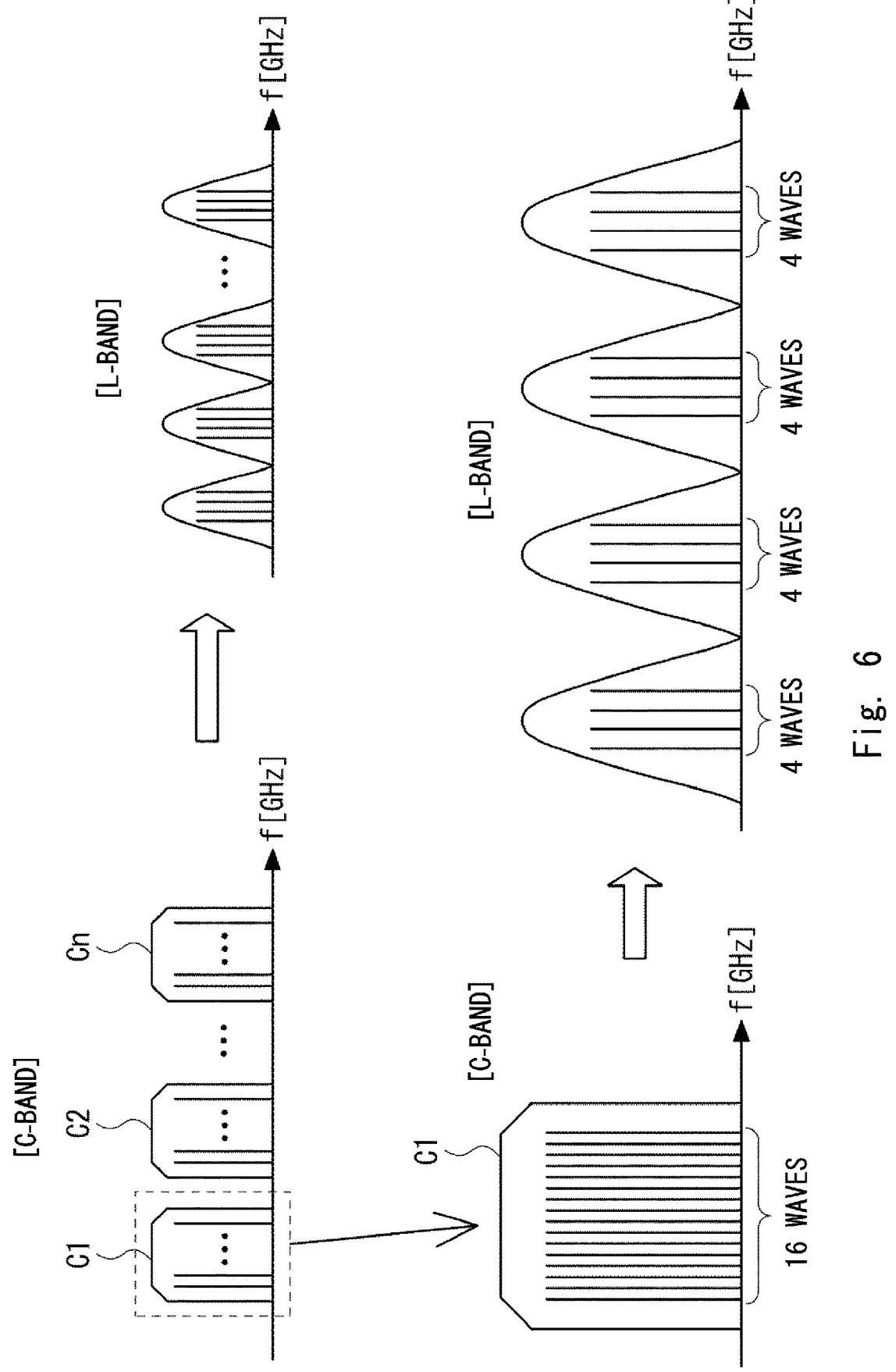
FIG. 6 is a diagram illustrating an outline of a wavelength conversion operation.

Next, a wavelength conversion operation will be described. FIG. 6 illustrates an outline of the wavelength conversion operation. When attention is paid to an optical signal composed of 16 waves on a C-band side (solid line portion in FIG. 6) as a wavelength conversion target, the optical signal is dropped in units of 16 waves by the WSS 11 in step S103, and then further separated into wavelength units by a wavelength separation filter which is a narrow bandwidth AWG.

Since the optical signal after the wavelength conversion does not need to be arranged in a continuous region of the L-band, the optical signal can be arranged at a certain interval. For example, 16 waves can be arranged as a group of four consecutive wavelengths, and free wavelengths can be arranged between the groups. Namely, multiplexing can be performed by a wavelength multiplexing filter configured as a wide bandwidth AWG having a wide guard band.

Note that the narrow bandwidth AWG requires temperature adjustment, and is expensive because Peltier or the like is generally mounted. On the other hand, since the wide bandwidth AWG does not require temperature adjustment and is inexpensive, according to the present configuration, the cost of the wavelength conversion apparatus and the optical transmission apparatus can be reduced.

Second Example Embodiment

An optical transmission apparatus according to a second example embodiment will be described. The optical transmission apparatus according to the second example embodiment has a configuration in which the wavelength conversion apparatus 10 of the optical transmission apparatus 100 according to the first example embodiment is replaced with a wavelength conversion apparatus 20.

Figure 7:
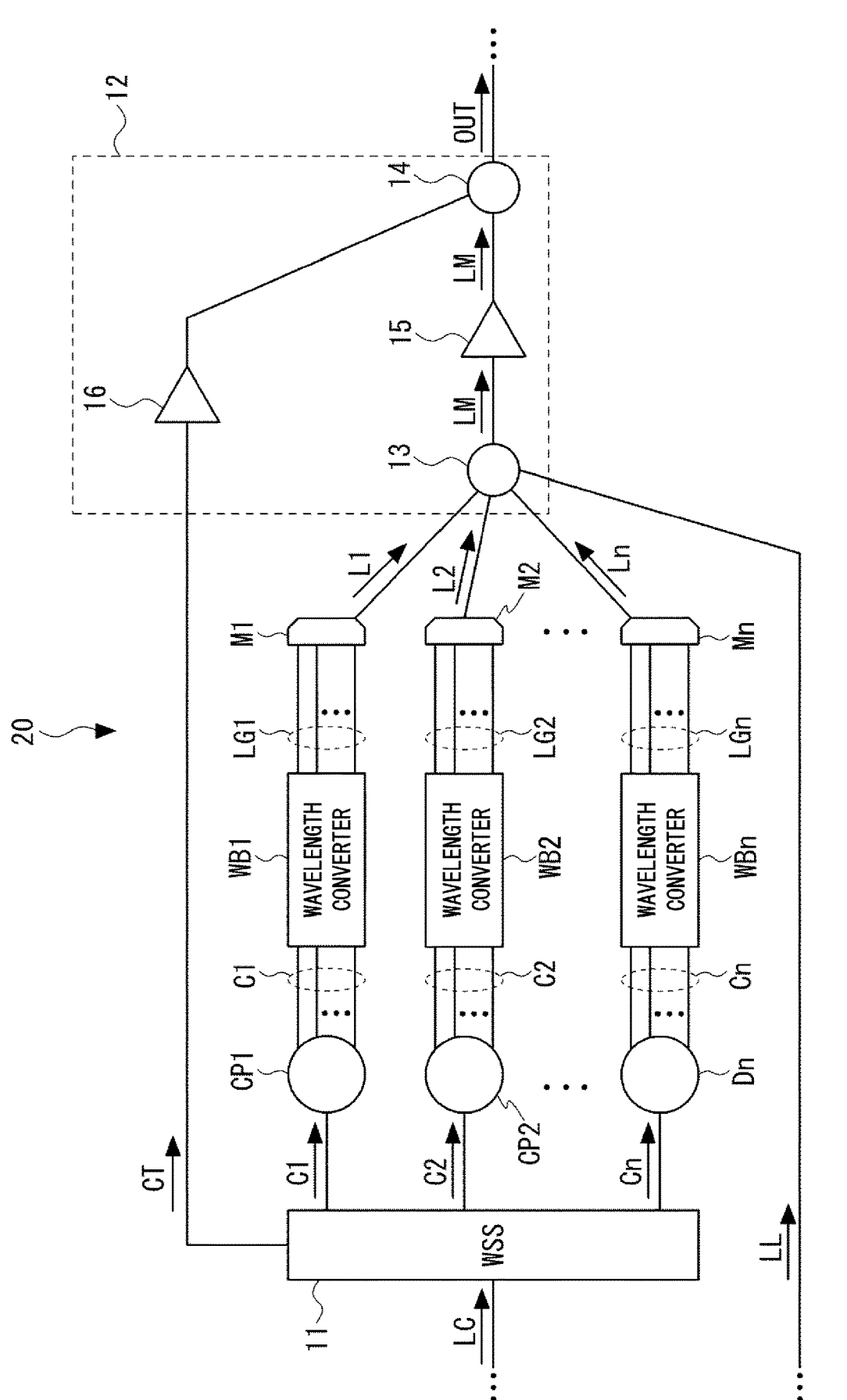
FIG. 7 is a diagram schematically illustrating a configuration of a wavelength conversion apparatus according to a second example embodiment.

FIG. 7 schematically illustrates a configuration of the wavelength conversion apparatus 20 according to the second example embodiment. The wavelength conversion apparatus 20 has a configuration in which the wavelength separation filters D1 to Dn of the wavelength conversion apparatus 10 are replaced with optical couplers CP1 to CPn, and the wavelength converters WA1 to WAn are replaced with wavelength converters WB1 to WBn, respectively.

The optical couplers CP1 to CPn are configured, for example, as optical couplers that branch C-band drop signals C1 to Cn to be input into a plurality of optical signals of the same intensity, and output the branched drop signals C1 to Cn to the wavelength converters WB1 to WBn, respectively.

The wavelength converters WB1 to WBn convert optical signals of wavelengths of the C-band included in the branched drop signals C1 to Cn into the optical signals of the L-band, and output the resultant signals to the wavelength multiplexing filters M1 to Mn as the L-band optical signal groups LG1 to LGn.

Hereinafter, a configuration and an operation of the wavelength conversion apparatus according to the second example embodiment will be described in detail. FIG. 8 is a flowchart of an operation of the optical transmission apparatus according to the second example embodiment. In FIG. 8, steps S104 and S105 in FIG. 5 are replaced with steps S204 and S205. Steps S101 to S103 and steps S106 to S110 are the same as those in FIG. 5, and thus description thereof is omitted.

Figure 9:
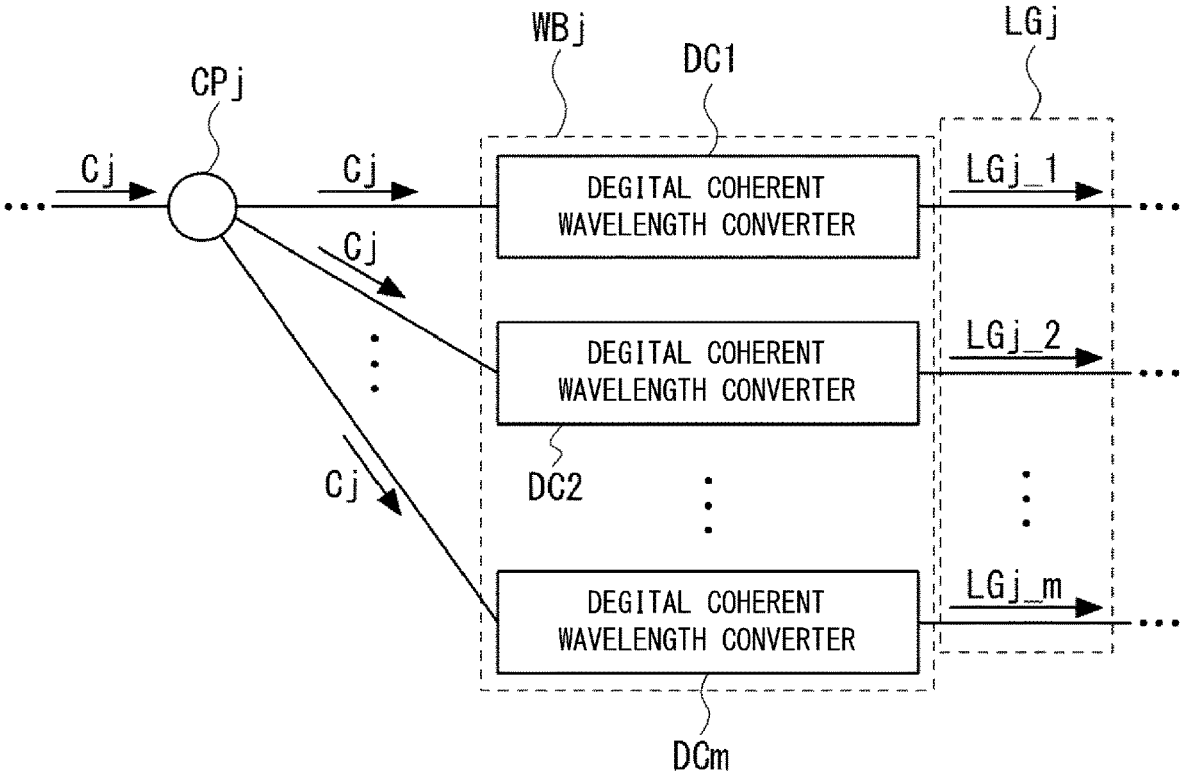
FIG. 9 is a diagram schematically illustrating a configuration of a wavelength converter according to the second example embodiment.

In the present example embodiment, the wavelength converters WB1 to WBn have a common configuration, and a configuration of the wavelength converter WBj will be described as a representative. Note that j is an integer of 1 or more to n or less. FIG. 9 schematically illustrates a configuration of the wavelength converter WBj according to the second example embodiment. The wavelength converter WBj has digital coherent wavelength converters DC1 to DCm. Note that m is an integer of 2 or more.
Step S204
The optical coupler CPj branches an input drop signal Cj into m pieces, and outputs each piece to the digital coherent wavelength converters DC1 to DCm. Note that m is an integer of 2 or more.
Step S205
The digital coherent wavelength converters DC1 to DCm receive only the C-band optical signals of a specific single wavelength included in the drop signal Cj, and convert the received optical signals into L-band optical signals LGj_1 to LGj_m. For example, the digital coherent wavelength converters DC1 to DCm can receive only optical signals of a specific one wavelength from optical signals of a plurality of wavelengths included in the drop signal Cj by coherent detection. Then, an optical signal of a single wavelength of the L-band can be output based on the received optical signal of one wavelength. The wavelength converter WBj outputs the optical signal group LGj including the converted L-band optical signals LGj_1 to LGj_m of the plurality of single wavelengths to a wavelength multiplexing filter Mj.

Thus, the wavelength conversion apparatus 20 can convert the C-band optical signal into the L-band optical signal in the same manner as the wavelength conversion apparatus 10 according to the first example embodiment.

Further, in the present configuration, a relatively expensive wavelength separation filter configured as the narrow bandwidth AWG of the wavelength conversion apparatus 10 according to the first example embodiment can be replaced with an inexpensive optical coupler. As a result, the manufacturing cost of the wavelength conversion apparatus can be reduced as compared with the first example embodiment.

Third Example Embodiment

An optical transmission apparatus according to a third example embodiment will be described. The optical transmission apparatus according to the third example embodiment has a configuration in which the wavelength conversion apparatus 10 of the optical transmission apparatus 100 according to the first example embodiment is replaced with a wavelength conversion apparatus 30.

Figure 10:
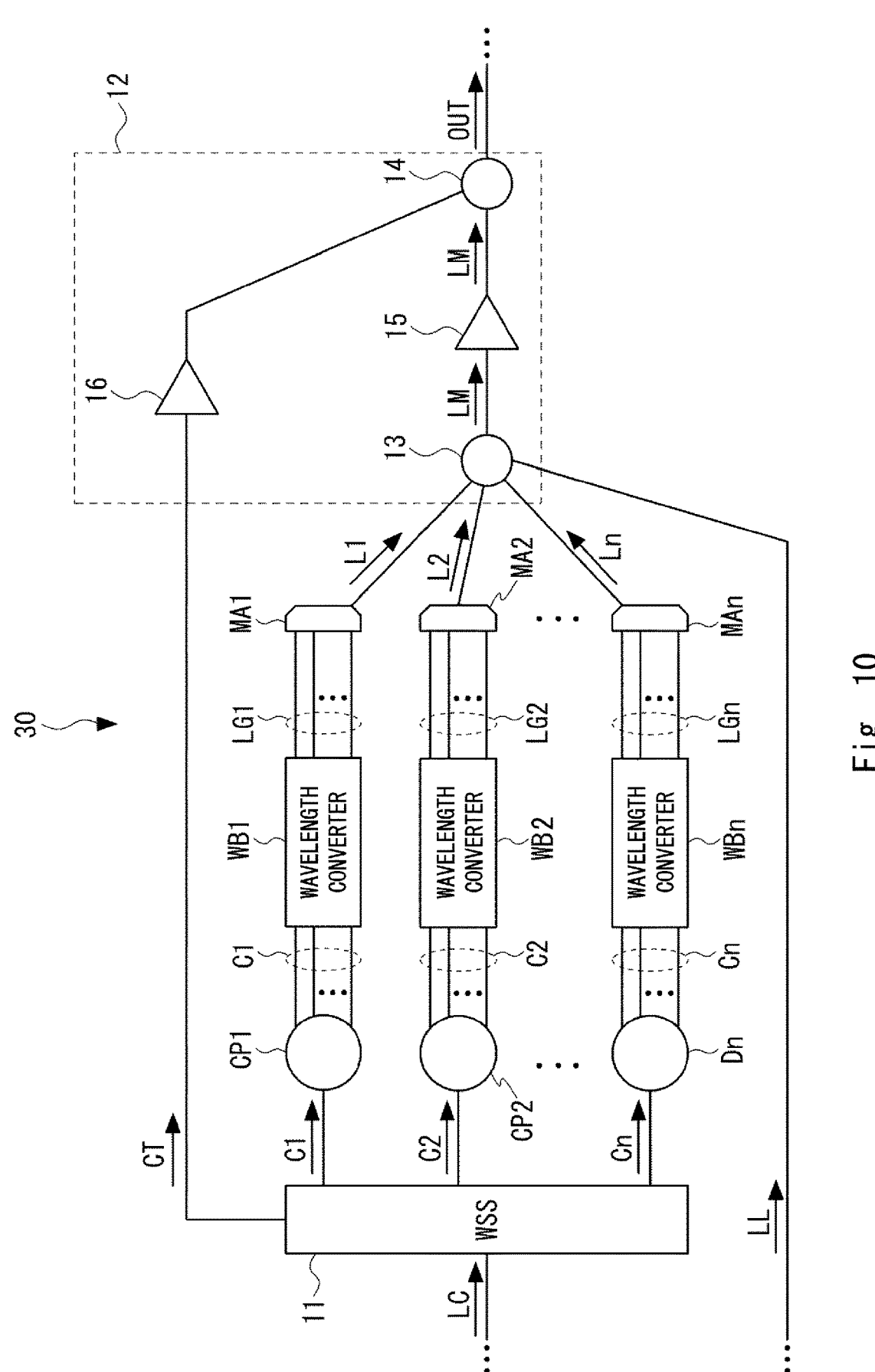
FIG. 10 is a diagram schematically illustrating a configuration of a wavelength conversion apparatus according to a third example embodiment.

FIG. 10 schematically illustrates a configuration of the wavelength conversion apparatus 30 according to the third example embodiment. The wavelength conversion apparatus 30 has a configuration in which the wavelength multiplexing filters M1 to Mn of the wavelength conversion apparatus 10 are replaced with wavelength multiplexing filters MA1 to MAn, respectively.

The wavelength multiplexing filters MA1 to MAn are composed of a first filter group for filtering at intervals of 200 GHz and a second filter group having a center wavelength different from that of the first filter group. Thus, guard bands in wavelength-multiplexed optical signals L1 to Ln after L-band conversion, which are output from the wavelength multiplexing filters MA1 to Man, can be arranged at different positions.

Figure 11:
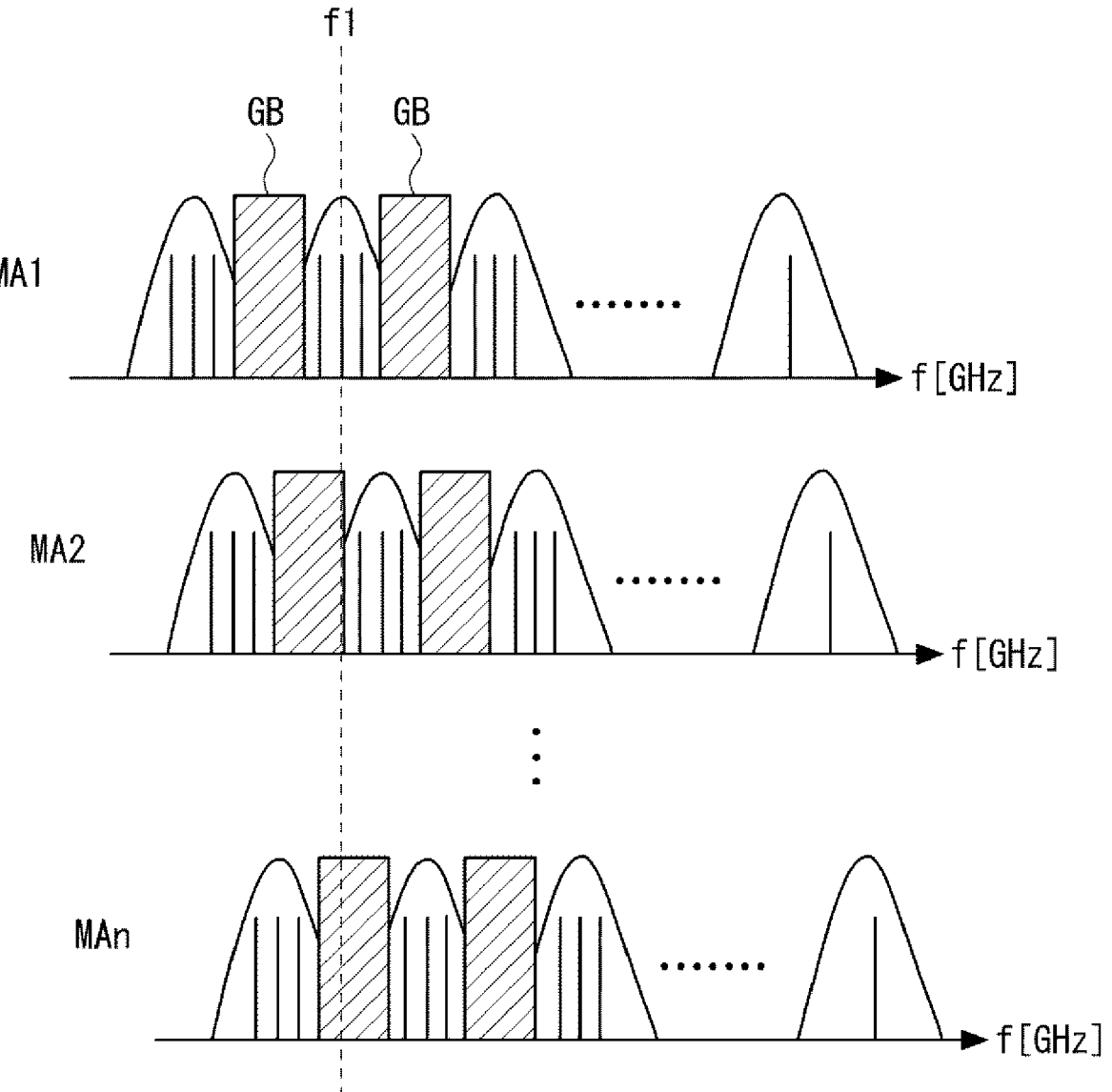
FIG. 11 is a diagram illustrating an outline of filtering in a wavelength multiplexing filter.

FIG. 11 illustrates an outline of filtering in the wavelength multiplexing filters MA1 to MAn. In this example, the L-band optical signals having passed through the wavelength multiplexing filters MA1 to MAn is shifted in center wavelength, and the guard bands are also at different positions. As a result, the optical signal passing through one wavelength multiplexing filter can be superimposed on a band of the guard band of another wavelength multiplexing filter, for example, as at a frequency f1 of FIG. 11.

Accordingly, in the L-band, the band disabled by the guard band can be eliminated or reduced, and the band of the L-band can be effectively utilized.

Fourth Example Embodiment

Figure 12:
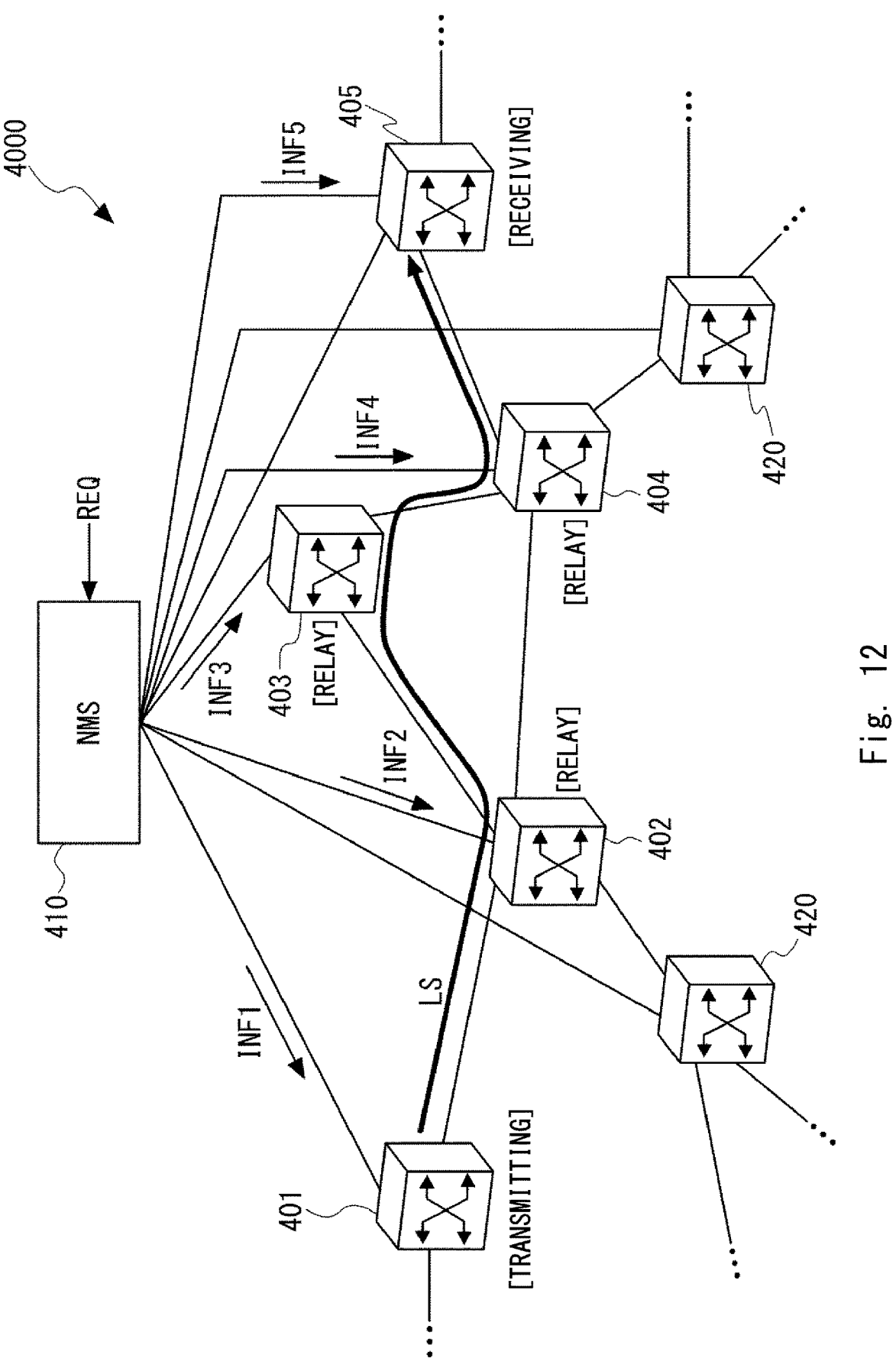
FIG. 12 is a diagram schematically illustrating a configuration of an optical transmission network according to a fourth example embodiment.

An optical transmission network according to a fourth example embodiment will be described. FIG. 12 schematically illustrates a configuration of an optical transmission network 4000 according to a fourth example embodiment. The optical transmission network 4000 includes a plurality of optical transmission apparatuses and a network management apparatus 410. In this example, among a plurality of optical transmission apparatuses, a wavelength-multiplexed optical signal LS is transmitted from an optical transmission device 401, which is a transmission node, to an optical transmission apparatus 405, which is a reception node, via optical transmission apparatuses 402 to 404. Optical transmission apparatuses other than the optical transmission apparatuses 401 to 405 are indicated by a reference numeral 420. In the following description, the network management apparatus is also referred to as a network management system (NMS).

When the wavelength-multiplexed optical signal LS is a wavelength-multiplexed optical signal being input to the optical transmission apparatus according to the above-described example embodiment, it is equivalent to the above-described wavelength-multiplexed optical signal IN. When the wavelength-multiplexed optical signal LS is a wavelength-multiplexed optical signal being output from the optical transmission apparatus according to the above-described example embodiment, it is equivalent to the above-described wavelength-multiplexed optical signal OUT.

Figure 13:
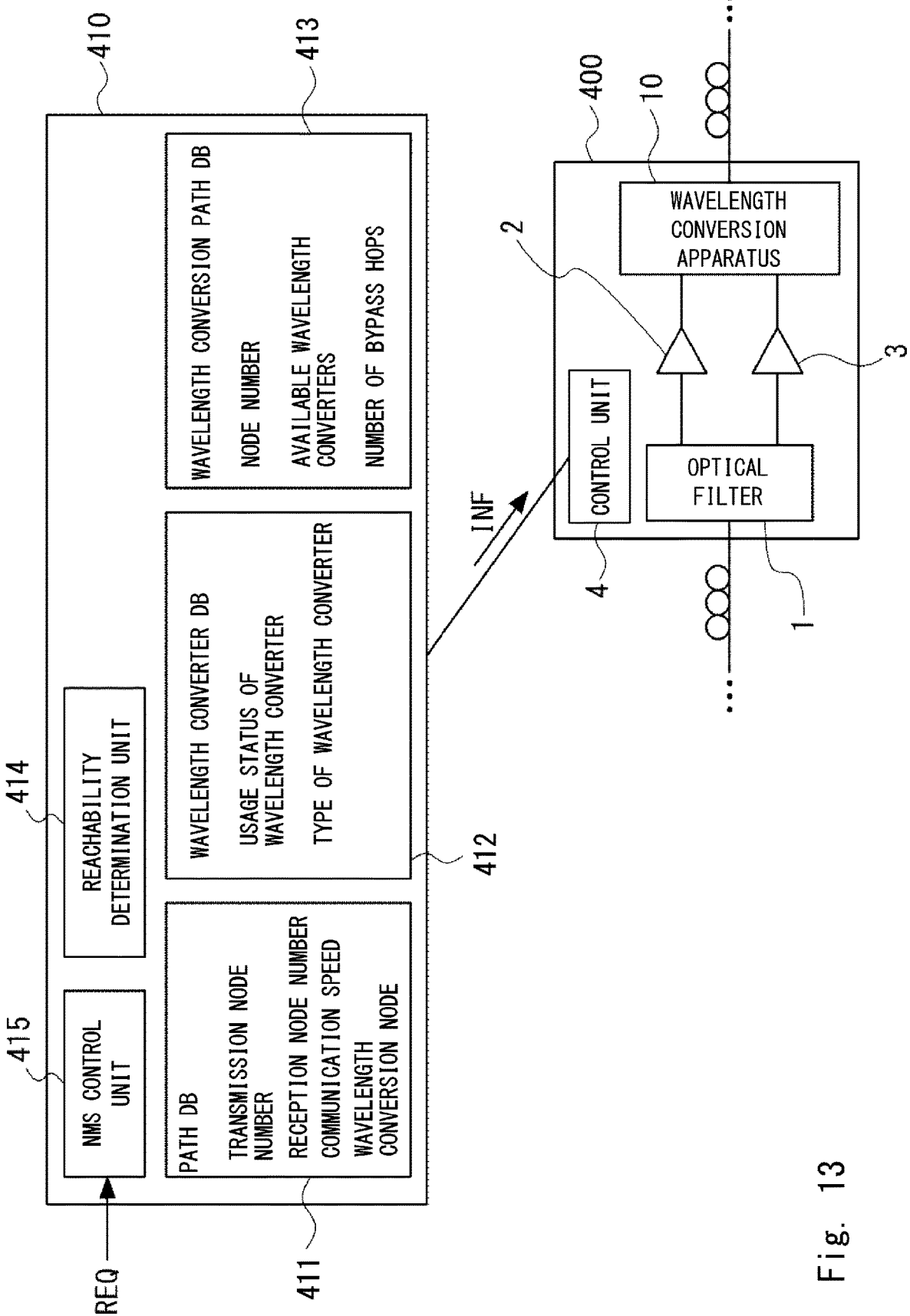
FIG. 13 is a diagram schematically illustrating a configuration of a network management apparatus and an optical transmission apparatus according to a fourth example embodiment.

Next, configurations of each optical transmission apparatus and a NMS 410 will be described. In the present example embodiment, the optical transmission apparatuses 401 to 405 and 420 have a shared configuration, and herein, an optical transmission apparatus 400 having the shared configuration will be described as a representative example. FIG. 13 schematically illustrates the configuration of the NMS 410 and the optical transmission apparatus 400.

The optical transmission apparatus 400 has a configuration in which a control unit 4 is added to the optical transmission apparatus 100 according to the first example embodiment.

The NMS 410 includes a path database 411, a wavelength converter database 412, a wavelength conversion path database 413, a reachability determination unit 414, and an NMS control unit 415. In the following description, the database is also referred to as DB. In the following description, the network management apparatus is also referred to as a network management system (NMS).

The path DB 411 stores information for managing a transmission source node number, a transmission destination node number, a communication speed, and a wavelength conversion node. The wavelength converter DB 412 stores information for managing a node number, a usage status of a wavelength converter, and a type of the wavelength converter. The wavelength conversion path DB 413 stores information for managing a node number, available wavelength converter information, and the number of bypass hops.

Next, an operation in the optical transmission network 4000 will be described. FIG. 14 is a flowchart of the operation of the optical transmission network according to the fourth example embodiment.
Step S401
The NMS 410 receives a wavelength conversion request REQ. The wavelength conversion request REQ is transmitted from, for example, a higher-level apparatus of the NMS 410 to the NMS 410 in response to a user's request or the like.
Step S402
When the wavelength conversion request REQ is received, the NMS control unit 415 refers to the path DB 411. Accordingly, the NMS control unit 415 recognizes that the optical transmission apparatus 401 is a transmission source node, that the optical transmission apparatus 405 is a transmission destination node, and a communication speed and a wavelength conversion node between these.

Step S403
The NMS control unit 415 refers to the wavelength converter DB 412 in order to recognize a usage status of the wavelength converter in a communication path. As a result, the NMS control unit 415 identifies the optical transmission apparatus arranged in the communication path between the optical transmission apparatus 401 and the optical transmission apparatus 405, and recognizes the usage status of the wavelength converter and a wavelength converter type of the identified optical transmission apparatus.
Step S404
The NMS control unit 415 identifies a wavelength converter that can be used in each optical transmission apparatus in the optical transmission network, based on the usage status of the wavelength converter of the optical transmission apparatus arranged in the communication path, which is recognized by referring to the wavelength converter DB 412. Information of the available wavelength converter, i.e., which wavelength converter of which optical transmission apparatus is available and the number of bypass hops that the available wavelength converter can achieve are registered in the wavelength conversion path DB 413.
Step S405
The reachability determination unit 414 refers to a communication speed stored in the path DB 411 and the information of available wavelength converters stored in the wavelength conversion path DB 413, compares the communication speed and the information with a pre-calculated S/N threshold, and determines whether an optical signal is reachable between the optical transmission apparatuses.
Step S406
When the optical signal is reachable, the NMS control unit 415 notifies each of the optical transmission apparatuses of the wavelength conversion information. In this example, wavelength conversion information INF1 to INF5 for individually performing the wavelength conversion operation is notified to each of the optical transmission apparatuses 401 to 405 in the path through which a wavelength-multiplexed optical signal L is transmitted.
Step S407
When the wavelength conversion information INF1 to INF5 is received, the control unit 4 controls the wavelength conversion apparatus 10 in each of the optical transmission apparatuses 401 to 405 to perform the wavelength conversion operation instructed by the wavelength conversion information INF1 to INF5. For example, each of the optical transmission apparatuses 401 to 405 shifts the optical signal of the C-band wavelength designated by the wavelength conversion information INF1 to INF5 to the L-band, and deals the signal of the C-band wavelength not designated as a through signal.

As described above, according to the present configuration, it is possible to generate a bypass route by the wavelength conversion operation as appropriate in each optical transmission apparatus of the communication route while ensuring reliable arrival of the optical signal, based on the accumulated information. This makes it possible to both ensure reliability of an optical transmission network and achieve efficient use of a communication band.

Other Example Embodiments

The present disclosure is not limited to the above-described example embodiments, and can be appropriately modified without departing from the spirit. For example, in the above-described example embodiment, a part of the wavelength of the C-band is described as shifting to the L-band, but this is merely an example. In short, a part of the wavelength of a certain band other than the C-band and the L-band may be shifted to another band other than the C-band and the L-band. Namely, the first band may be a band other than the C-band and the L-band, and the second band may be a band other than the C-band and the L-band.

Also in the wavelength conversion apparatus according to the second example embodiment, the wavelength multiplexing filter according to the third example embodiment may be applied.

In the fourth example embodiment, an optical transmission apparatus in which the control unit 4 is added to the optical transmission apparatus 100 according to the first example embodiment is used, but this is merely an example. Namely, an optical transmission apparatus in which the control unit 4 is added to the optical transmission apparatus according to the second or third example embodiment may be used, or an optical transmission apparatus in which the control unit 4 is added to the optical transmission apparatus according to any one of the above-described example embodiments may be used in combination as appropriate.

The first to fourth example embodiments can be combined as desirable by one of ordinary skill in the art.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

Some or all of the above-described example embodiments may be described as the following supplementary notes, but are not limited thereto.

(Supplementary note 1) A wavelength conversion apparatus including: a first demultiplexer configured to wavelength-separate an optical signal having a plurality of wavelengths of a first band that are wavelength-multiplexed, the optical signal being wavelength-separated in advance from a wavelength-multiplexed optical signal including optical signals of the first band and a second band, into n drop signals acquired by wavelength-multiplexing optical signals of a plurality of predetermined wavelengths to be subjected to wavelength conversion and a through signal acquired by wavelength-multiplexing optical signals of wavelengths not to be subjected to wavelength conversion; n second demultiplexers configured to demultiplex the optical signals of the plurality of predetermined wavelengths being included in the n drop signals, into a plurality of optical signals; n wavelength converters configured to wavelength-convert first optical signals of wavelengths being included in the plurality of optical signals demultiplexed by the n second demultiplexers into a plurality of second optical signals of the second band; n first multiplexers configured to multiplex the plurality of second optical signals after wavelength conversion that are output from the n wavelength converters and output n third optical signals; and a multiplexing unit configured to multiplex the n third optical signals, an optical signal having a plurality of wavelengths of the second band that are wavelength-multiplexed, the optical signal being wavelength-separated in advance from the wavelength-multiplexed optical signal, and the through signal, and output the resultant.

(Supplementary note 2) The wavelength conversion apparatus according to supplementary note 1, wherein the n second demultiplexers wavelength-separate the optical signals of the plurality of wavelengths being included in the n drop signals into the first optical signals of a plurality of single wavelengths, and the n wavelength converters convert the first optical signals of the plurality of single wavelengths that are output from each of the n second demultiplexers into the plurality of second optical signals.

(Supplementary note 3) The wavelength conversion apparatus according to supplementary note 2, wherein the n first multiplexers are configured as wavelength filters having a wider bandwidth than the n second demultiplexers.

(Supplementary note 4) The wavelength conversion apparatus according to supplementary note 3, wherein each of the n second demultiplexers is configured as a wavelength filter having a different center wavelength of a passband.

(Supplementary note 5) The wavelength conversion apparatus according to supplementary note 1, wherein the n second demultiplexers branch the n drop signals into the plurality of optical signals, and the n wavelength converters wavelength-convert an optical signal of one wavelength among the plurality of predetermined wavelengths that are wavelength-multiplexed to each of the plurality of optical signals, into an optical signal of a single wavelength of the second band.

(Supplementary note 6) The wavelength conversion apparatus according to supplementary note 5, wherein each of the n second demultiplexers branches the one drop signal to be input into 2 or more m optical signals, and each of the n wavelength converters includes m digital coherent wavelength converters to which one of the m optical signals is input, and each of the m digital coherent wavelength converters converts an optical signal of a predetermined one wavelength among the optical signals of the plurality of predetermined wavelengths that are wavelength-multiplexed, into the input optical signal, into an optical signal of a single wavelength of the second band.

(Supplementary note 7) The wavelength conversion apparatus according to any one of supplementary notes 1 to 6, wherein the multiplexing unit includes a second multiplexer configured to multiplex the n third optical signals and optical signals of the second band that are wavelength-separated in advance from the wavelength-multiplexed optical signal, and a third multiplexer configured to multiplex the optical signals multiplexed by the second multiplexer and the through signal, and output the resultant.

(Supplementary note 8) The wavelength conversion apparatus according to supplementary note 7, wherein the multiplexing unit further includes: a first optical amplifier configured to compensate for a loss of the optical signal multiplexed by the second multiplexer, the first optical amplifier being inserted between the second multiplexer and the third multiplexer; and a second optical amplifier configured to compensate for a loss of the through signal, the second optical amplifier being inserted between the first multiplexer and the third multiplexer.

(Supplementary note 9) An optical transmission apparatus including: a third demultiplexer configured to wavelength-separate, from a wavelength-multiplexed optical signal including optical signals of a first band and a second band, an optical signal having a plurality of wavelengths of the first band that are wavelength-multiplexed and an optical signal having a plurality of wavelengths of the second band that are wavelength-multiplexed; and a wavelength conversion apparatus including: a first demultiplexer configured to wavelength-separate an optical signal having a plurality of wavelengths of the first band that are wavelength-multiplexed, the optical signal being wavelength-separated by the third demultiplexer, into n drop signals acquired by wavelength-multiplexing optical signals of a plurality of predetermined wavelengths to be subjected to wavelength conversion and a through signal acquired by wavelength-multiplexing optical signals of wavelengths not to be subjected to wavelength conversion; n second demultiplexers configured to demultiplex the optical signal of the plurality of predetermined wavelengths included in the n drop signals into a plurality of optical signals; n wavelength converters configured to wavelength-convert first optical signals of wavelengths included in the plurality of optical signals being demultiplexed by the n second demultiplexers into a plurality of second optical signals of the second band; n first multiplexers configured to multiplex the plurality of second optical signals after wavelength conversion that are output from the n wavelength converters and output n third optical signals; and a multiplexing unit configured to multiplex the n third optical signals, the optical signal having a plurality of wavelengths of the second band that are wavelength-multiplexed, the optical signal being wavelength-separated by the third demultiplexer, and the through signal, and output the resultant.

(Supplementary note 10) A wavelength conversion method including: wavelength-separating, by a first demultiplexer, an optical signal having a plurality of wavelengths of a first band that are wavelength-multiplexed, the optical signal being wavelength-separated in advance from a wavelength-multiplexed optical signal including optical signals of the first band and a second band, into n drop signals acquired by wavelength-multiplexing optical signals of a plurality of predetermined wavelengths to be subjected to wavelength conversion and a through signal acquired by wavelength-multiplexing optical signals of wavelengths not to be subjected to wavelength conversion; demultiplexing, by n second demultiplexers, optical signals of the plurality of predetermined wavelengths being included in the n drop signals into a plurality of optical signals; wavelength-converting, by n wavelength converters, first optical signals of wavelengths included in the plurality of optical signals being demultiplexed by the n second demultiplexers into a plurality of second optical signals of the second band; multiplexing each of the plurality of second optical signals after wavelength conversion that are output from the n wavelength converters and outputting n third optical signals; and multiplexing the n third optical signals, an optical signal having a plurality of wavelengths of the second band that are wavelength-multiplexed, the optical signal being wavelength-separated in advance from the wavelength-multiplexed optical signal, and the through signal, and outputting the resultant.

(Supplementary note 11) An optical transmission network including an optical transmission apparatus and a management apparatus configured to output information for controlling a wavelength conversion operation to the optical transmission apparatus in response to a given request, the optical transmission apparatus including: a third demultiplexer configured to wavelength-separate, from a wavelength-multiplexed optical signal including optical signals of a first band and a second band, an optical signal having a plurality of wavelengths of the first band that are wavelength-multiplexed and an optical signal having a plurality of wavelengths of the second band that are wavelength-multiplexed, and a wavelength conversion apparatus including: a first demultiplexer configured to wavelength-separate an optical signal having a plurality of wavelengths of the first band that are wavelength-multiplexed, the optical signal being wavelength-separated by the third demultiplexer, into n drop signals acquired by wavelength-multiplexing optical signals of a plurality of predetermined wavelengths to be subjected to wavelength conversion and a through signal acquired by wavelength-multiplexing optical signals of wavelengths not to be subjected to wavelength conversion; n second demultiplexers configured to demultiplex optical signals of the plurality of predetermined wavelengths being included in the n drop signals into a plurality of optical signals; n wavelength converters configured to wavelength-convert first optical signals of wavelengths being included in the plurality of optical signals being demultiplexed by the n second demultiplexers into a plurality of second optical signals of the second band; n first multiplexers configured to multiplex the plurality of second optical signals after wavelength conversion that are output from the n wavelength converters and output n third optical signals; and a multiplexing unit configured to multiplex the n third optical signals, an optical signal having a plurality of wavelengths of the second band that are wavelength-multiplexed, the optical signal being wavelength-separated by the third demultiplexer, and the through signal, and output the resultant, the information given from the management apparatus designating an optical signal having a plurality of predetermined wavelengths to be subjected to the wavelength conversion, the optical signal being wavelength-separated by the first demultiplexer.

What is claimed is:

1. A wavelength conversion apparatus comprising:
a first demultiplexer configured to wavelength-separate an optical signal having a plurality of wavelengths of a first band that are wavelength-multiplexed, the optical signal being wavelength-separated in advance from a wavelength-multiplexed optical signal including optical signals of the first band and a second band, into n drop signals acquired by wavelength-multiplexing optical signals of a plurality of predetermined wavelengths to be subjected to wavelength conversion and a through signal acquired by wavelength-multiplexing optical signals of wavelengths not to be subjected to wavelength conversion;
n second demultiplexers configured to demultiplex optical signals of the plurality of predetermined wavelengths being included in the n drop signals into a plurality of optical signals;
n wavelength converters configured to wavelength-convert first optical signals of wavelengths being included in the plurality of optical signals being demultiplexed by the n second demultiplexers into a plurality of second optical signals of the second band;
n first multiplexers configured to multiplex the plurality of second optical signals after wavelength conversion being output from the n wavelength converters and output n third optical signals; and
a multiplexing unit configured to multiplex the n third optical signals, an optical signal having a plurality of wavelengths of the second band that are wavelength-multiplexed, the optical signal being wavelength-separated in advance from the wavelength-multiplexed optical signal, and the through signal, and output the resultant.

2. The wavelength conversion apparatus according to claim 1, wherein
the n second demultiplexers wavelength-separate the optical signals of the plurality of wavelengths being included in the n drop signals into the first optical signals of a plurality of single wavelengths, and
the n wavelength converters convert the first optical signals of the plurality of single wavelengths that are output from each of the n second demultiplexers into the plurality of second optical signals.

3. The wavelength conversion apparatus according to claim 2, wherein the n first multiplexers are configured as wavelength filters having a wider bandwidth than the n second demultiplexers.

4. The wavelength conversion apparatus according to claim 3, wherein each of the n second demultiplexers is configured as a wavelength filter having a different center wavelength of a passband.

5. The wavelength conversion apparatus according to claim 1, wherein the n second demultiplexers branch the n drop signals into the plurality of optical signals, and the n wavelength converters wavelength-convert an optical signal of one wavelength among the plurality of predetermined wavelengths that are wavelength-multiplexed to each of the plurality of optical signals into an optical signal of a single wavelength of the second band.

6. The wavelength conversion apparatus according to claim 5, wherein each of the n second demultiplexers branches the one drop signal to be input, into 2 or more m optical signals, each of the n wavelength converters includes m digital coherent wavelength converters to which one of the m optical signals is input, and each of the m digital coherent wavelength converters wavelength-converts an optical signal of a predetermined one wavelength among the optical signals of the plurality of predetermined wavelengths that are wavelength-multiplexed into the input optical signal, into an optical signal of a single wavelength of the second band.

7. The wavelength conversion apparatus according to claim 1, wherein the multiplexing unit includes: a second multiplexer configured to multiplex the n third optical signals and optical signals of the second band that are wavelength-separated in advance from the wavelength-multiplexed optical signal; and a third multiplexer configured to multiplex the optical signal multiplexed by the second multiplexer and the through signal, and output the resultant.

8. The wavelength conversion apparatus according to claim 7, wherein the multiplexing unit further includes: a first optical amplifier configured to compensate for a loss of the optical signal being multiplexed by the second multiplexer, the first optical amplifier being inserted between the second multiplexer and the third multiplexer; and a second optical amplifier configured to compensate for a loss of the through signal, the second optical amplifier being inserted between the first multiplexer and the third multiplexer.

9. An optical transmission apparatus comprising:

a third demultiplexer configured to wavelength-separate, from a wavelength-multiplexed optical signal including optical signals of a first band and a second band, an optical signal having a plurality of wavelengths of the first band that are wavelength-multiplexed and an optical signal having a plurality of wavelengths of the second band that are wavelength-multiplexed; and a wavelength conversion apparatus including:

a first demultiplexer configured to wavelength-separate an optical signal having a plurality of wavelengths of the first band being wavelength-multiplexed, the optical signal being wavelength-separated by the third demultiplexer, into n drop signals acquired by wavelength-multiplexing optical signals having a plurality of predetermined wavelengths to be subjected to wavelength conversion and a through signal acquired by wavelength-multiplexing optical signals having wavelengths not to be subjected to wavelength conversion;

n second demultiplexers configured to demultiplex optical signals of the plurality of predetermined wavelengths included in the n drop signals into a plurality of optical signals;

n wavelength converters configured to wavelength-convert first optical signals of wavelengths included in the plurality of optical signals being demultiplexed by the n second demultiplexers into a plurality of second optical signals of the second band;

n first multiplexers configured to multiplex the plurality of second optical signals after wavelength conversion that are output from the n wavelength converters and output n third optical signals; and a multiplexing unit configured to multiplex the n third optical signals, an optical signal having a plurality of wavelengths of the second band that are wavelength-multiplexed, the optical signal being wavelength-separated by the third demultiplexer, and the through signal, and output the resultant.

10. A wavelength conversion method comprising:

wavelength-separating, by a first demultiplexer, an optical signal having a plurality of wavelengths of a first band that are wavelength-multiplexed, the optical signal being wavelength-separated in advance from a wavelength-multiplexed optical signal including optical signals of the first band and a second band into n drop signals acquired by wavelength-multiplexing optical signals of a plurality of predetermined wavelengths to be subjected to wavelength conversion and a through signal acquired by wavelength-multiplexing optical signals of wavelengths not to be subjected to wavelength conversion;

demultiplexing, by n second demultiplexers, the optical signals of the plurality of predetermined wavelengths being included in the n drop signals, into a plurality of optical signals;

wavelength-converting, by n wavelength converters, first optical signals of wavelengths included in the plurality of optical signals being demultiplexed by the n second demultiplexers into a plurality of second optical signals of the second band;

multiplexing the plurality of second optical signals after wavelength conversion that are output from the n wavelength converters and outputting n third optical signals; and multiplexing the n third optical signals, an optical signal having a plurality of wavelengths of the second band that are wavelength-multiplexed, the optical signal being wavelength-separated in advance from the wavelength-multiplexed optical signal, and the through signal, and outputting the resultant.

* * * * *